United States Patent
Qian et al.

(10) Patent No.: US 10,348,784 B2
(45) Date of Patent: Jul. 9, 2019

(54) CONFERENCING SERVER DIRECTLY ACCESSIBLE FROM PUBLIC INTERNET

(71) Applicant: Microsoft Technology Licensing, LLC, Redmond, WA (US)

(72) Inventors: Tin Qian, Redmond, WA (US); Rajesh Gunnalan, Sammamish, WA (US); Timothy Mark Moore, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 135 days.

(21) Appl. No.: 15/433,636

(22) Filed: Feb. 15, 2017

(65) Prior Publication Data
US 2018/0234471 A1 Aug. 16, 2018

(51) Int. Cl.
*G06F 15/16* (2006.01)
*H04L 29/06* (2006.01)
(Continued)

(52) U.S. Cl.
CPC ........ *H04L 65/403* (2013.01); *H04L 43/0811* (2013.01); *H04L 61/2514* (2013.01);
(Continued)

(58) Field of Classification Search
CPC ............. H04L 61/2564; H04L 61/2575; H04L 61/2589; H04L 65/403; H04L 65/608; H04N 7/15
See application file for complete search history.

(56) References Cited

U.S. PATENT DOCUMENTS 6,219,044 B1 * 4/2001 Ansberry ................ G06F 9/542
715/753
7,668,907 B1 * 2/2010 Janakiraman ....... H04L 12/1822
709/204
(Continued)

OTHER PUBLICATIONS

Reddy, et al., "Improving ICE Interface Selection Using Port Control Protocol (PCP) Flow Extension", https://tools.ietf.org/html/draft-reddy-mmusic-ice-best-interface-pcp-00, Oct. 10, 2013, pp. 1-8.
(Continued)

*Primary Examiner* — Mohamed A. Wasel
(74) *Attorney, Agent, or Firm* — NovoTechIP International PLLC

(57) ABSTRACT

A conferencing server is directly accessible from the public Internet and has a host transport address, which is a combination of a public IP address on the public Internet and an associated port. It comprises conference hosting logic for hosting at least one conference, in which media data is transmitted and received via the conferencing server between participant endpoints; media processing logic configured to process received media data of the conference for transmission in the conference; multiplexing control logic configured to determine a plurality of multiplexing tokens to be used by the participant endpoints; and demultiplexing logic configured to identify received multiplexing tokens in transport layer payload data of a sequence data packets received from the participant endpoints at the host transport address, and use the multiplexing tokens identified in the transport layer payload data to demultiplex the data packets for processing by the media processing logic.

20 Claims, 12 Drawing Sheets

(51) Int. Cl.
*H04L 12/26* (2006.01)
*H04N 7/15* (2006.01)
*H04L 29/12* (2006.01)

(52) U.S. Cl.
CPC ...... *H04L 61/2564* (2013.01); *H04L 61/2575* (2013.01); *H04L 61/2589* (2013.01); *H04L 65/1069* (2013.01); *H04L 65/4038* (2013.01); *H04L 65/608* (2013.01); *H04L 69/16* (2013.01); *H04N 7/15* (2013.01)

(56) References Cited

U.S. PATENT DOCUMENTS

| | | | | |
|---|---|---|---|---|
| 8,826,390 | B1* | 9/2014 | Varda | G06F 21/6218 726/4 |
| 9,705,691 | B2* | 7/2017 | Tripathi | H04L 12/1831 |
| 2004/0202303 | A1* | 10/2004 | Costa-Requena | H04M 3/56 379/205.01 |
| 2007/0091907 | A1 | 4/2007 | Seshadri et al. | |
| 2008/0219426 | A1* | 9/2008 | Lai | H04M 3/382 379/202.01 |
| 2010/0175119 | A1* | 7/2010 | Vitaletti | G06F 21/6218 726/9 |
| 2010/0215162 | A1* | 8/2010 | Gupta | H04M 3/56 379/142.06 |
| 2011/0023096 | A1* | 1/2011 | Xiao | H04L 63/0236 726/5 |
| 2011/0193932 | A1* | 8/2011 | Long | H04L 12/1827 348/14.07 |
| 2013/0185440 | A1 | 7/2013 | Blau et al. | |
| 2014/0093059 | A1* | 4/2014 | Kanevsky | H04M 3/2227 379/202.01 |
| 2014/0247756 | A1* | 9/2014 | Zhou | H04L 12/18 370/263 |
| 2015/0358472 | A1 | 12/2015 | Rosenberg | |
| 2016/0094586 | A1 | 3/2016 | Gunnalan et al. | |
| 2016/0094591 | A1 | 3/2016 | Moore et al. | |
| 2016/0105472 | A1* | 4/2016 | Chitroda | H04L 65/1069 709/204 |
| 2016/0119315 | A1 | 4/2016 | Uzelac et al. | |
| 2016/0294913 | A1 | 10/2016 | Jansson et al. | |
| 2016/0380789 | A1 | 12/2016 | Gunnalan et al. | |
| 2017/0142096 | A1* | 5/2017 | Reddy | H04L 63/0823 |

OTHER PUBLICATIONS

"Cisco Meeting Server—Scalability & Resilience Server Deployment Guide", http://www.cisco.com/c/dam/en/us/td/docs/conferencing/ciscoMeetingServer/Deployment_Guide/Version-2-0/Cisco-Meeting-Server-2-0-Scalable-and-Resilient-Deployments.pdf, Published on: Sep. 7, 2016, 156 pages.

"LifeSize Transit Server Guide", http://www.dekom.com/fileadmin/user_upload/manufacturers/lifesize/LifeSize-Serverguide-Transit_10_L01.pdf, Published on: Oct. 2008, pp. 1-44.

Keranen, et al., "Interactive Connectivity Establishment (ICE): A Protocol for Network Address Translator (NAT) Traversal", https://tools.ietf.org/html/draft-ietf-ice-rfc5245bis-05, Published on: Oct. 31, 2016, 1-94 pages.

"Pexip Reverse Proxy and TURN Server Deployment Guide", https://docs.pexip.com/files/v12/Pexip_Infinity_Reverse_Proxy_and_TURN_Deployment_Guide_v3.0.e.pdf, Published on: May 2016, pp. 1-22.

"International Search Report and Written Opinion Issued in PCT Application No. PCT/US18/017313", dated Apr. 20, 2018, 12 Pages.

* cited by examiner

CONFERENCING SERVER DIRECTLY ACCESSIBLE FROM PUBLIC INTERNET

TECHNICAL FIELD

The present invention relates to a conferencing server comprising conferencing logic for hosting, at the conferencing server, one or more conferences, such as voice or video conference calls.

BACKGROUND

A communication network may for example be a packet-based network and/or an internet. A network typically includes different types of network nodes, such as user devices, routers, network address translators (NATs), proxy servers, media relay servers etc., which perform different functions within the network. For instance, routers route packets between individual networks of an internet. NATs also perform such routing, as well as performing network address translation i.e. to mask the network address of the sender. Communication between two communicating nodes, such as user devices, may be via other nodes of the network, i.e. intermediate nodes such as routers, NATs and media relay servers. Every active network interface (e.g. of a user device, server etc.) connected to the network is assigned a network address, e.g. IP (Internet Protocol) address, so that is data can be routed thereto via the network. This may for example be assigned by an ISP (Internet Service Provider) in the case of a public network, or other network administrator.

A media session may be established between two endpoints, such as user devices, connected via a communication network so that real-time media can be transmitted and received between those endpoints via the network. The endpoints run client software to enable the media session to be established. The media session may be a Voice or Video over IP (VoIP) session, in which audio and/or video data of a call is transmitted and received between the endpoints in the VoIP session as media streams. Endpoints and other types of network nodes may be identified by a network address, such as a transport address. A transport address is formed of an IP address and a port number identifying a port associated with the IP address. A media session being may be established between transport addresses associated with the endpoints.

An example of a media session is a SIP ("Session Initiation Protocol") media session. SIP signalling, e.g. to establish or terminate a call or other communication event, may be via one or more SIP (proxy) server(s). To this end, the SIP proxy forwards SIP requests (e.g. "INVITE", "ACK", "BYE") and SIP responses (e.g. "100 TRYING", "180 RINGING", "200 OK") between endpoints. In contrast to a media relay server, the media (e.g. audio/video) data itself does not flow via a basic SIP proxy i.e. the proxy handles only signalling, though it may in some cases be possible to combine proxy and media relay functionality in some cases. To establish the media session, one of the endpoints may transmit a media session request to the other endpoint. Herein, an endpoint that initiates a request for a media session (e.g. audio/video communications) is called an "initiating endpoint" or equivalently a "caller endpoint". An endpoint that receives and processes the communication request from the caller is called a "responding endpoint" or "callee endpoint". Each endpoint may have multiple associated transport addresses e.g. a local transport address, a transport address on the public side of a NAT, a transport address allocated on a relay server etc. During media session establishment, for each endpoint, a respective address may be selected for that endpoint to use to transmit and receive data in the media session. For example, the addresses may be selected in accordance with the ICE ("Interactive Connectivity Establishment") protocol. Once the media session is established, media can flow between those selected addresses of the different endpoints.

A known type of media relay server is a TURN (Traversal Using Relays around NAT) server, e.g. a TURN/STUN (Session Traversal Utilities for NAT) incorporating both TURN and STUN functionality. The network may have a layered architecture, whereby different logical layers provide different types of node-to-node communication services. Each layer is served by the layer immediately below that layer (other than the lowest layer) and provides services to the layer immediately above that layer (other than the highest layer). A media relay server is distinguished from lower-layer components such as routers and NATS in that it operates at the highest layer (application layer) of the network layers. The application layer provides process-to-process connectivity. For example, the TURN protocol may be implemented at the application layer to handle (e.g. generate, receive and/or process) TURN messages, each formed of a TURN header and a TURN payload containing e.g. media data for outputting to a user. The TURN messages are passed down to a transport layer below the network layer. At the transport layer, one or more transport layer protocols such as UDP (User Datagram Protocol) or TCP (Transmission Control Protocol) are implemented to packetize a set of received TURN message(s) into one or more transport layer packets, each having a separate transport layer (e.g. TCP/UDP) header that is attached at the transport layer. The transport layer provides host-to-host (end-to-end) connectivity. Transport layer packets are, in turn are passed to an internet layer (network layer) below the transport layer. At the internet layer, an internet layer protocol such as IP is implemented to further packetize a set of received transport layer packet(s) into one or more internet layer (e.g. IP) packets, each having a separate network layer (e.g. IP) header that is attached at the internet layer. The internet layer provides packet routing between adjacent networks. Internet layer packets are, in turn, passed down to the lowest layer (link layer) for framing and transmission via the network. In the reverse direction, data received from the network is passed up to the IP layer, at which network layer (e.g. IP) headers are removed and the remaining network layer payload data, which constitutes one or more transport layer packets including transport layer header(s), is passed up to the transport layer. At the transport layer, transport layer (e.g. UDP/TCP) headers are removed, and the remaining payload data, which constitutes one or more TURN messages in this example, is passed up to the application layer for final processing, e.g. to output any media data contained in them to a user, or for the purposes of relaying the TURN message(s) onwards. This type of message flow is implemented at both endpoints and TURN servers i.e. endpoints and TURN servers operate at the application layer in this manner.

An IP address uniquely identifies a network interface of a network node within a network, e.g. within a public network such as the Internet or within a private network. There may be multiple application layer processes running in that node, and a transport address (IP address+port number) uniquely identifies an application layer process running on that node. That is, each process is assigned its own unique port. The port is a software entity to which messages for that process can be written so that they become available to that process. An IP address is used for routing at the internet layer by internet layer protocols (e.g. IP) and constitutes an internet layer network address that is included in the headers of internet layer packets, whereas the port number is used at the transport layer by transport layer protocols e.g. TCP/UDP to ensure that received data is passed to the correct application layer process. A transport layer packet includes a port number in the header, which identifies the process for which that packet is destined.

In contrast to media relay servers, routers typically only operate at the internet layer, routing IP packets based on IP addresses in IP packet headers. Notionally, NATs also only operate at the network layer and are distinguished from basic routers in that NATs modify IP headers during routing to mask the IP address of the source. However, increasingly NATs perform modifications at the transport layer, i.e. to transport layer packet headers, so at to also mask the source port number e.g. to provide one-to-many network address translation.

In the context of ICE, transport addresses available to an endpoint—e.g. its host address, a public address mapped to the host address at a NAT, and a transport address of a TURN server that can receive media data from the other endpoint on behalf of that endpoint and relay it to other endpoint—are referred to as that endpoint's candidates. They are determined by that endpoint and communicated to the other endpoint in a candidate gathering phase. Each endpoint then determines a set of "candidate pairs", i.e. a set of possible pairings of the endpoint's own addresses with the other endpoint's addresses. Connectivity checks are then performed for each candidate pair to determine whether or not that candidate pair is valid, i.e. to determine whether probe data sent from an endpoint's own address in that pair to the other address in that pair is successfully received by the other endpoint. A media session is then established between the endpoints using a selected candidate pair that was determined to be valid in the connectivity checks. Media data of the media session is transmitted from each of the endpoints to the network address of the other endpoint in the selected candidate pair. The progress of the connectivity checks and status of the candidate pairs is tracked by respective ICE state machines implemented at the endpoints.

That is, each endpoint may have multiple associated transport addresses e.g. a local transport address, a transport address on the public side of a NAT, a transport address allocated on a relay server etc. During media session establishment, for each endpoint, a respective address is selected for that endpoint to use to transmit and receive data in the media session. For example, the addresses may be selected in accordance with the ICE ("Interactive Connectivity Establishment") protocol. Once the media session is established, media can flow between those selected addresses of the different endpoints. To select a path, a list of candidate pairs is generated, each of which comprises a network address available to a first of the endpoint—"local" candidates from the perspective of the first endpoint, though note that "local" in this context is not restricted to host addresses on its local interface, and can also include reflexive addresses on the public side of the NAT, or a relay network address of a media relay server that can relay media data to the first endpoint (relayed network address)—and a network address available to the second endpoint ("remote" candidates from the perspective of the first endpoint). Every possible pairing of local and remote candidates may be checked to determine whether or not it is valid, by sending one or more probe messages from the local address to the remote address during the connectivity checks.

SUMMARY

According to one aspect of the present invention, a conferencing server is configured to be directly accessible from the public Internet and comprises: a network interface having a host transport address, the host transport address being a combination of a public IP address on the public Internet and an associated port; conference hosting logic for hosting, at the conferencing server, at least one conference, in which media data is transmitted and received via the conferencing server between participant endpoints; media processing logic configured to process received media data of the conference for transmission in the conference; multiplexing control logic configured to determine a plurality of multiplexing tokens to be used by the participant endpoints; demultiplexing logic configured to identify received multiplexing tokens in transport layer payload data of sequence data packets received from the participant endpoints at the host transport address, and use the multiplexing tokens identified in the transport layer payload data to demultiplex the data packets for processing by the media processing logic.

By way of example, a preferred use-case for the present invention is to provide a global "online" conferencing server deployment, in which conferencing is provided as a service to multiple organizations, from a pool of such publically-accessible conferencing servers hosted in a domain of a service provider. This is in contrast to a more traditional local deployment, in which each organization is served by a local deployment that they typically manage themselves.

Opening up the conferencing server to make it accessible on the public Internet in this way presents various challenges above and beyond the traditional deployment model, in particular security issues and challenges arising from the prevalence of NATs on the public Internet. As explained in detail below, the use of multiplexing tokens in the transport layer payload data can provide enhanced security and robustness to NAT (particularly, but not exclusively, in the context of ICE). It also allows a conferencing server to be provided that is fully functional with a very small number of ports. This simplifies requirements for customer sites as they need only open up a small number of ports on their firewalls to communicate the conferencing server, easing the security concerns of network administrators.

In embodiments, the conferencing server may comprise candidate gathering logic configured to determine a set of one or more candidate pairs for each of the participant endpoints, by exchanging network addresses between the conferencing server and that endpoint, wherein at least one candidate pair in the set is a multiplexed candidate pair comprising the host transport address and one of the multiplexing tokens uniquely selected for use by that endpoint; connectivity check logic configured to perform, for each of the participant endpoints, connectivity checks for at least one candidate pair in the set to determine whether it is valid; and candidate selection logic configured to select, for each participant endpoint in the conference, a candidate pair determined to be valid in the connectivity checks for that endpoint. In some cases, the connectivity checks may be performed for only the multiplexed candidate pair.

The media processing logic may comprise audio mixing logic configured to generate a mixed audio stream for each participant endpoint in the hosted conference.

The media processing logic may comprise video switching logic configured to switch between different received video streams for each participant endpoint in the hosted conference.

The multiplexing tokens may be negotiated between the conferencing server and the participant endpoint via secure signalling channels.

The multiplexing control logic may be configured to generate the multiplexing tokens for the endpoints.

The demultiplexing logic may be configured to provide media data received from each of the participating endpoints to one or more media processing components of the media processing logic associated with that endpoint.

The demultiplexing logic may be configured to demultiplex UDP datagrams received from each of the plurality of participant endpoints at the host transport address by: identifying a received multiplexing token in transport layer payload data of each of the UDP datagrams received from that endpoint, thereby identifying that endpoint as a source of that datagram, and providing media data of that UDP packet to the one or more media processing components associated with the identified endpoint.

The media processing logic may be configured to demultiplex the UDP datagrams without using a source transport address indicated with the UDP datagrams.

The demultiplexing logic may be configured to demultiplex TCP packets received from each of the plurality of participant endpoints at the host transport address by: identifying a multiplexing token received at the host transport address from that endpoint, as transport layer payload data, in association with an incoming TCP connection request from that endpoint, thereby identifying that endpoint as a source of that TCP connection request, accepting the incoming TCP connection request, thereby establishing a TCP connection, and associating the TCP connection with the one or more media processing functions associated with the identified endpoint, thereby providing a path for media data from the endpoint to those media processing components via the TCP connection.

The demultiplexing logic may be configured to accept a new incoming connection request from that endpoint when received in association with a matching multiplexing token, thereby establishing a new TCP connection, and associate the new TCP connection with the one or more media processing components, thereby providing a new path from the endpoint to those media processing components via the new TCP connection.

The TCP connection may persist when the new TCP connection is established, thereby simultaneously providing two paths from the endpoint to the one or more media processing components.

The TCP connection may be accepted and the multiplexing token is identified using the AcceptEx function, the multiplexing token being received in association with the TCP request in that it is received in an initial block of data read by the AcceptEx function.

The network interface may have a first transport address used to receive TCP packets and a second transport address used to receive UDP datagrams.

In an example Windows implementation, a single TCP socket may be bound to a port of the first transport address at the conferencing server, and a single UDP socket is bound to a port of the second transport address at the conferencing server, and a single I/O (Input/Output) completion port of the conferencing server is bound to both the TCP and UDP sockets.

The demultiplexing logic may comprise a plurality of processor cores, each of which is configured to serve the I/O completion port.

Each of the processor cores may be configured to execute at least two threads, each of which is configured to serve the I/O completion port.

A second aspect of the present invention is directed to a method of hosting, at a conferencing server having a host transport address, at least one conference, in which media data is transmitted and received via the conferencing server between participant endpoints, the host transport address being a combination of a public IP address on the public Internet and an associated port, such that the conferencing server is directly accessible from the public Internet, the method comprising, at the conferencing server: determining a plurality of multiplexing tokens to be used by the participant endpoints; identifying received multiplexing tokens in transport layer payload data of a sequence data packets received from the participant endpoints at the host transport address; using the multiplexing tokens identified in the transport layer payload data to demultiplex the data packets for processing by the media processing logic; and processing media data of the conference, received in the demultiplexed packets, for transmission in the conference.

In embodiments, any feature in the conferencing server of the first aspect, or any embodiment thereof, may be implemented in performing the method.

A third aspect of the present invention is directed to a computer program product comprising code stored on a computer-readable storage medium and configured, when executed on a conferencing server to implement the method of the second aspect or any embodiment thereof.

BRIEF DESCRIPTION OF FIGURES

To aid understanding of the present invention and to show how embodiments of the same may be carried into effect, reference will now be made by way of example only to the following drawings in which.

Like reference signs denote corresponding features in the figures.

DETAILED DESCRIPTION OF EXAMPLE EMBODIMENTS

A conferencing server—also referred to herein as multipoint control unit (MCU) or "media server"—refers to a server entity that is capable of hosting one or more conferences, where preferably each conference can have three or more participants. In addition to forwarding media data received from participants in a conference to other participant(s) in the conference, it also implements higher-level conference hosting functions, typically higher-level functions such as audio mixing (in an audio conference), video switching (in a video conference, or screen sharing context), presence (that is tracking conference participants, as they join and leave the conference) and business logic functions. For each hosted conference, the conference server maintains a state for that conference, so that is can track the progress of the conference as it is conducted. Modern conferencing servers can also provide an increasingly rich array of conference hosting functions, such as language translation, recording and broadcasting (e.g. in a live Webinar context).

In existing network deployments, conferencing servers tend not to be directly accessible on the public Internet. Rather, they tend to be deployed in private networks, e.g. enterprise networks, and as such are only directly accessible within that private network. This means the conferencing server can only be accessed via the public Internet via a so-called "edge" server providing an interface between the private network and the Internet.

By way of context, an example of such a deployment is described below, wherein a media relay server, which is a TURN server, is deployed as an edge server to provide an interface to a conferencing server in a private network from the public Internet.

Figure 1:
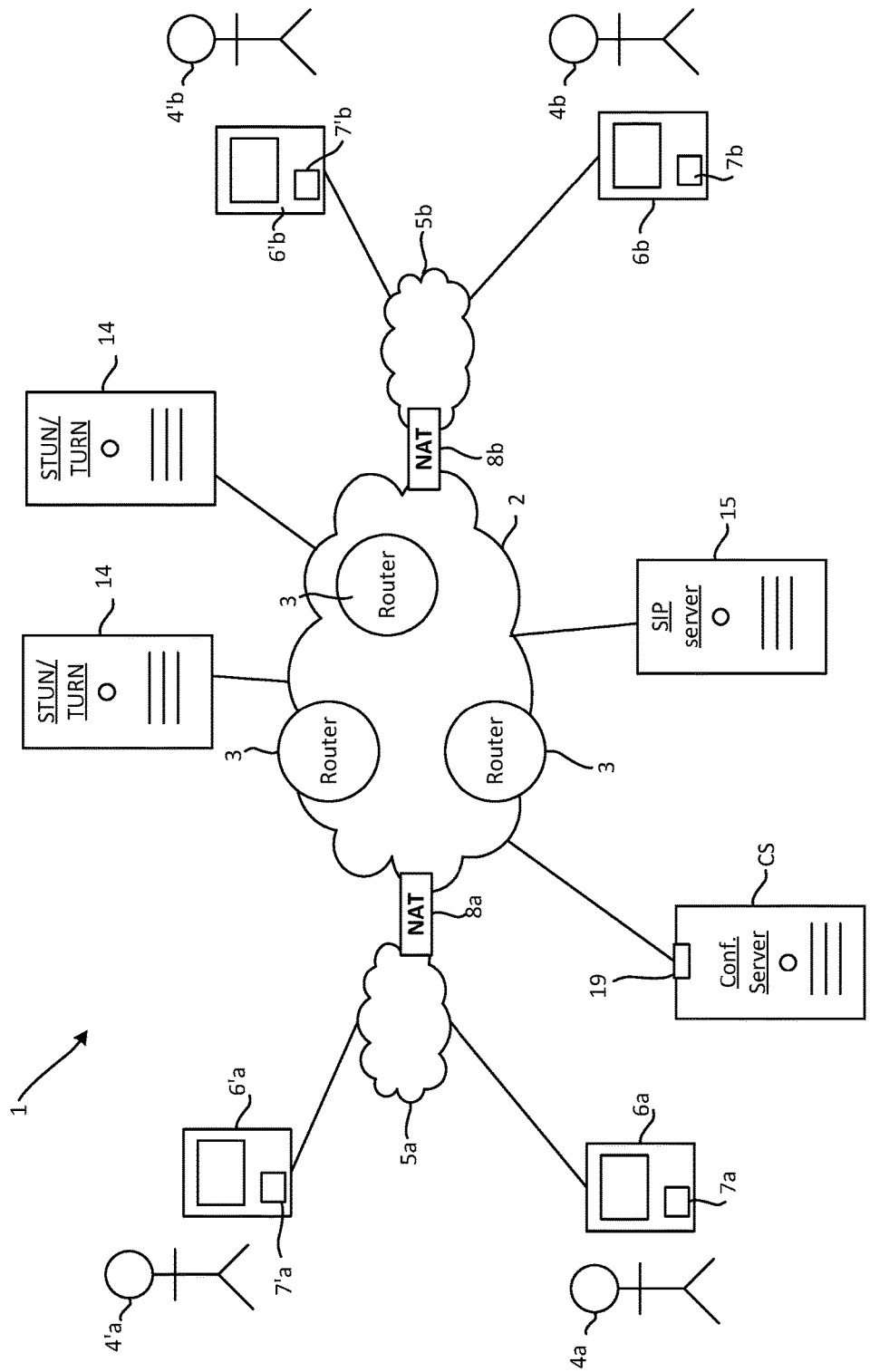
FIG. 1 shows a communication system.

FIG. 1 is a schematic illustration of a communication system, which comprises: a public network 2; first and second endpoints, which are first and second user devices 6a, 6b operated by first and second users 4a, 4b; third and fourth endpoints, which are third and fourth user devices 6'a, 6'b operated by third and fourth users 4'a, 4'b; one or more media relay servers 14 (two are shown by way of example); and one or more proxy servers (one is shown by way of example), such as SIP server(s) 15.

The public network 2 is the public Internet (capital I), i.e. the global, packet-based internet (that is, a system of interconnected individual networks) having a public address space and operating according to the TCP/IP Protocol Suite. The public network 2 comprises a plurality of routers 3 which route traffic between different individual networks (not shown) of the Internet 2.

IP addresses in the public address space of the Internet 2 are generally assigned by Internet Service Providers (ISPs), who in turn are allocated blocks of IP addresses from higher-level authorities.

FIG. 1 also shows at least one conferencing server CS connected to the Internet 2. The conferencing server CS is directly connected to the Internet, in that it comprises a network interface 19 having at least one IP address in the public address space of the Internet, via which the conferencing server CS is reachable. This makes the conferencing server directly accessible to the endpoints 6 on the public Internet 2.

As will be appreciated, this differs from more typical conference server deployments of the kind described above, and "opening up" the conferencing server CS to the pubic Internet 2 in this way created significant additional challenges compared with a more conventional deployment in a private network. This is discussed in greater detail below, but first additional details of the system of FIG. 1 will be described to provide useful context.

The relay servers 14 are TURN servers, whose operation is described below to provide context for the described embodiments of the invention. It is noted, however, that an aim of the described embodiments is to essentially eliminate the need for the TURN servers 14 for calls hosted by the conferencing server CS whenever possible, by opening up the conferencing server CS to the public Internet 2.

In contrast to a conferencing server CS, a media relay server 14 simply relays a received media stream to one endpoint, without providing any of the higher-level functions of a conferencing server.

The user devices 6a, 6'a are connected to, and are the network nodes of, a first packed-based private network 5a and the user devices 6'a, 6'b are connected to, and are the network nodes of, a second packet-based private network 5b.

Each node of a private network has a respective private network address in a private address space of that private network which other nodes connected to that same private network (and only such nodes) can use to communicate with that node over that private network (and only over that private network). That address is private in that it cannot be used to communicate with that node by devices which are not connected to that same private network e.g. it cannot be used within the public network 2. Moreover, whilst that address is unique within that private network, other nodes may use the same network address within different networks (e.g. the first and second user devices 6a, 6b might happen to have the same private network address but which is useable to communicate with the first user device 6a only within the first private network 5a and which is useable to communicate with the second user device 6b only within the second private network 5b).

To enable nodes of the first and second private networks 5a, 5b to communicate with the public network 2, they are connected to the public network 2 via a first and a second Network Address Translator (NAT) 8a, 8b respectively. Each NAT 8a, 8b has both a respective private network address in the applicable private address space (referred to as an address on the private side of that NAT) and a respective public network address in the public address space of the public network 2 (referred to as an address on the public side of that NAT). Thus, not only can nodes of the first and second private networks 5a, 5b communicate with the first and second NATs 8a, 8b respectively using those NATs' private network addresses, but nodes outside of those private network can communicate with those NATs 8a, 8b using those NATs' public network addresses.

A NAT (e.g. 8a, 8b) operates as an interface between a private network (e.g. 5a, 5b) and public network (e.g. 2) by mapping the private address space of the private network into the public address space of the public network, thereby enabling nodes of the private network to communicate outside of the private network over the public network. Nodes outside of one of the private networks (5a/5b) can direct traffic intended for a particular node of that private network to the relevant NAT (8a/8b) via the public network 2 using that NATs public address, which that NAT then forwards the traffic to that node via that private network.

The operation of a NAT is described in detail below.

The private networks 5a, 5b and public network 2 and constitute a communication network 1, of which the various user devices 6a . . . 6'b, NATs 8a, 8b, servers 14, 15, CS and routers 3 are network nodes. The communication network 1 is also an internet (which comprises the individual networks of the internet 2 as well as the private networks 5a, 5b).

The user devices 6a, 6b run respective instances of communication client software 7a, 7b. The client enables the user devices 6a, 6b to establish media sessions between the user devices 6a, 6b over the network 1, for example to facilitate a real-time communication event (e.g. a voice and/or video call) between the user's 4a, 4b so that the users 4a, 4b can communicate with one another over the network 1, with call audio and/or video being transmitted and received between the devices 6a, 6b in the media session. The communication is "real-time" in the sense in that there is only a short delay, for instance about 2 second or less, between audio/video being captured at a near-end device and received and output by the far-end device. The user devices 6'a, 6'b also run respective instances of the client software 7'a, 7'b to similar effect. The client may for example be a stand-alone application that is executed on a processor of the relevant user device, or a plugin to another application executed on the processor such as a Web browser.

Note the term "client" may be used to refer to the client software or to the endpoint device executing the software; it will be clear in context which is meant.

Figure 2:
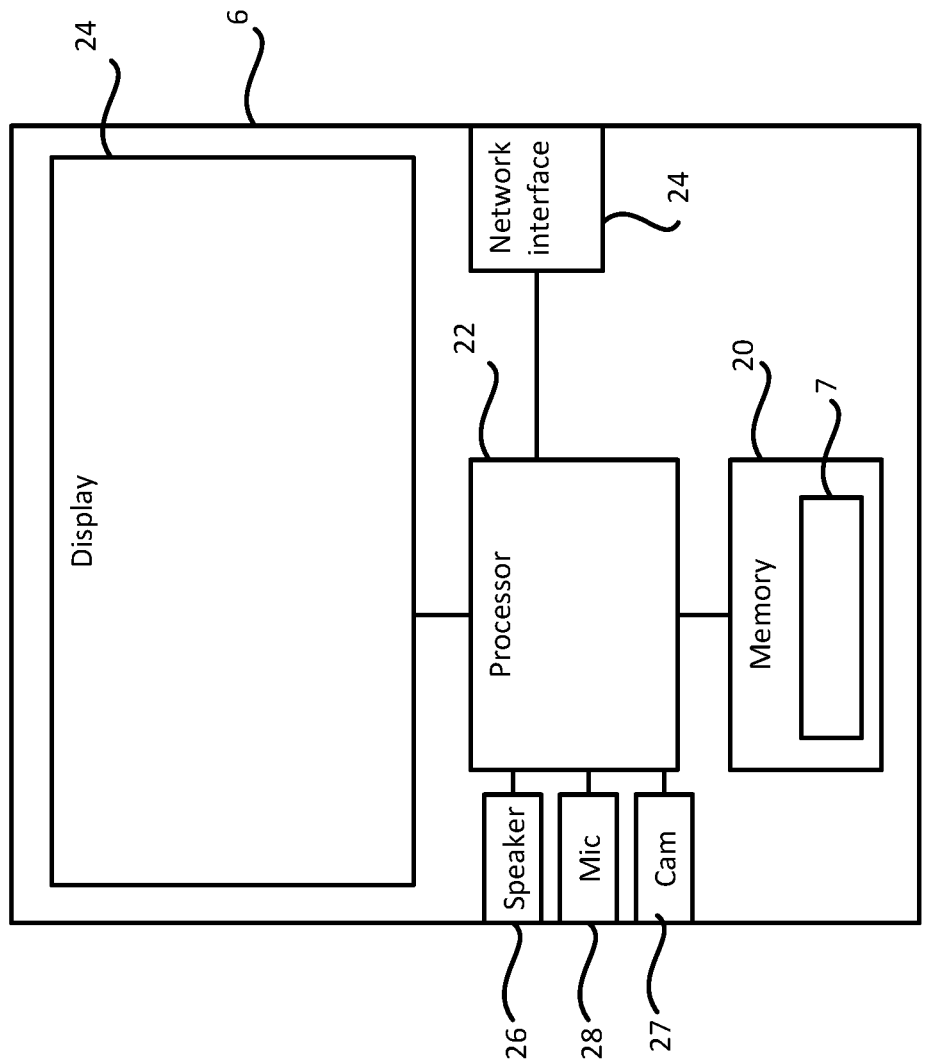
FIG. 2 shows a block diagram of a user device.

Alternatively or in addition, a user device may connect to the public network 2 by some other mechanism which does not involve any NATs though this is not shown in FIG. 2. For example, a user device may be connected via a Wi-Fi connection to a private network and to a public network via a mobile network with no NATs involved.

Figure 1A:
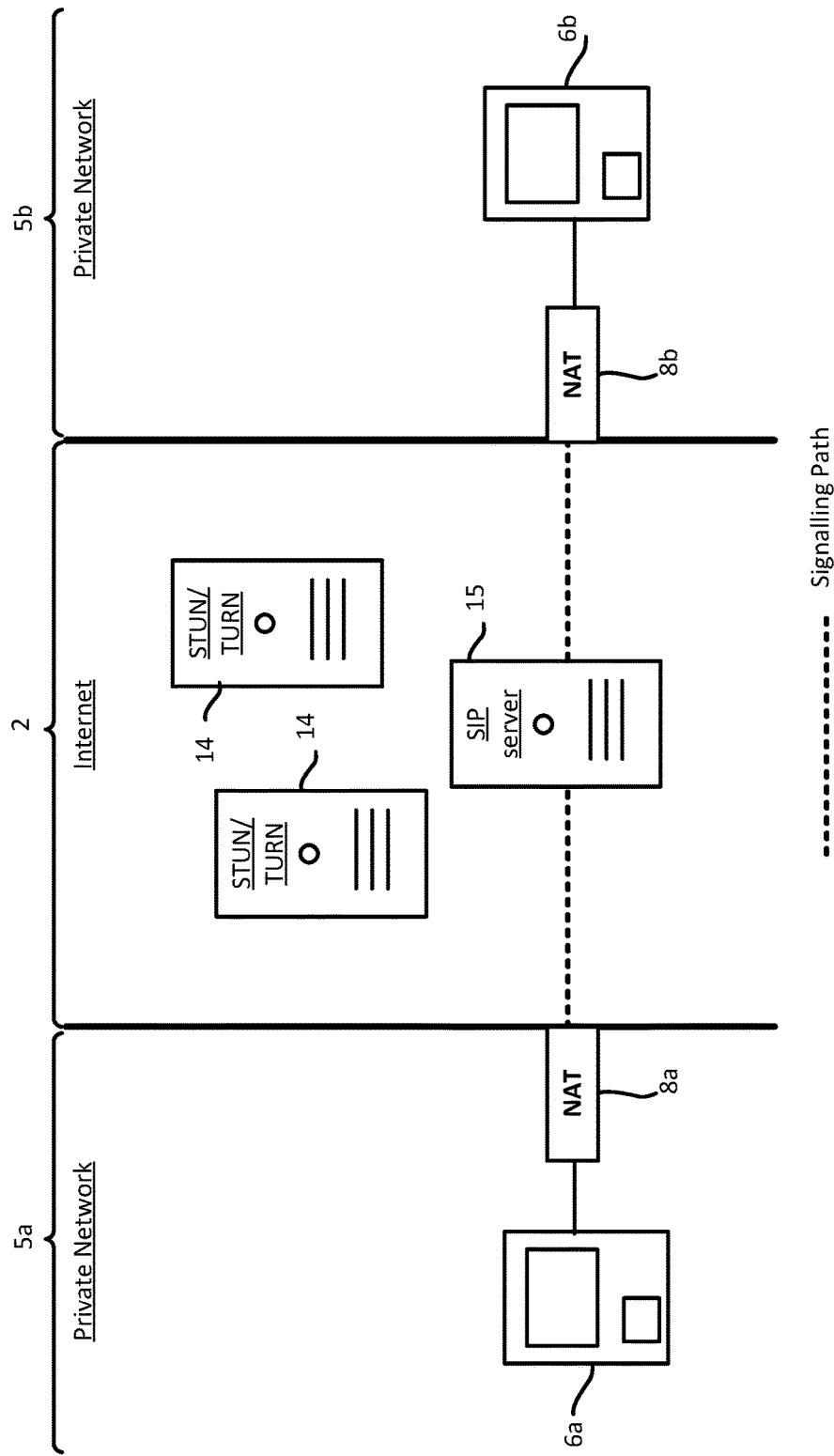
FIG. 1A shows a TURN deployment scenario.

FIG. 1A shows an exemplary signalling path (represented as a dotted line) for call signalling (not media flow). The signalling is between user devices 6a, 6b via an SIP proxy 15, and represents an exchange of SIP request-SIP response messages that results in a call or other communication event being established, terminated, modified etc.

In the described examples, a modification of the ICE protocol is used to establish a media path for the call, where the ICE signalling takes, in particular a candidate offer-answer exchange between the conferencing server CS and another endpoint 6, takes place via one or more such SIP proxies 15.

Once established, media data of the call can flow between the user devices 6a, 6b stream(s), for example via one or more media relay servers 14, or "directly" via a route through the network 2 that does not involve any application layer intermediaries i.e. only lower-layer intermediaries such as routers 3 and NATs 8.

FIG. 2 is a schematic block diagram of a user device 6 (e.g. 6a, 6b, 6'a, 6'b). The user device 6 is a computer device which can take a number of forms e.g. that of a desktop or laptop computer, mobile phone (e.g. smartphone), tablet computing device, wearable computing device, television (e.g. smart TV), set-top box, gaming console etc. The user device 6 comprises a processor 22 to which is connected memory 20, one or more output devices, such as a display 24 and loudspeaker(s) 26, one or more input devices, such as a camera 27 and microphone 28, and a network interface 24, such as an Ethernet, Wi-Fi or mobile network (e.g. 3G, Long-Term Evolution (LTE) etc.) interface which enables the user device 6 to connect to the network 1. The display 24 may comprise a touchscreen which can receive touch input from a user of the device 6, in which case the display 24 is also an input device of the user device 6. Any of the various components shown connected to the processor may be integrated in the user device 6, or non-integrated and connected to the processor 22 via a suitable external interface (wired e.g. Ethernet, Universal Serial Bus (USB), FireWire etc. or wireless e.g. Wi-Fi, Bluetooth, Near-field Communication (NFC) etc.). The memory 20 holds a copy of the client 7 which, when executed on the processor 22, causes the user device 6 to implement the functionality of the client 7. The client 7 has a user interface for receiving information from and outputting information to a user of the user device 6, including during a communication event such as a call.

The user interface may comprise, for example, a Graphical User Interface (GUI) which outputs information via the display 24 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, red, green, and blue (RGB) camera systems and combinations of these), motion gesture detection using accelerometers/gyroscopes, facial recognition, 3D displays, head, eye, and gaze tracking, immersive augmented reality and virtual reality systems etc.

Figure 3:
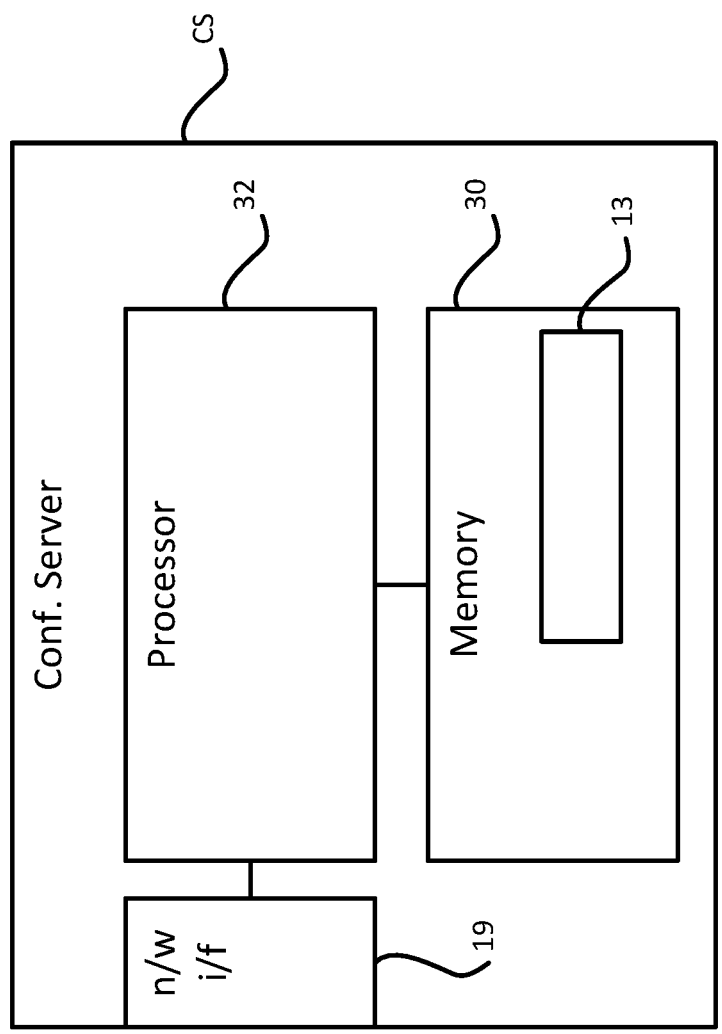
FIG. 3 shows a block diagram of a media relay server.

FIG. 3 is a schematic block diagram of the conferencing server CS. The conferencing server CS comprises a processor 32 to which is connected memory 30, and the network interface 19 which, as noted, is configured to enables the conferencing server CS to connect to the Internet 2 directly. The memory 30 holds conference control software 13 (that is, executable, computer-readable instructions) which, when executed on the processor 32, causes the conference server CS to implement the functionality of the conference control software 13. Although depicted as a single entity, the functionality of the conferencing server CS may be distributed across multiple devices, for example multiple server devices in a datacentre. In that case, each of those server devices may be individually reachable on the Internet 2.

The network 1 has a layered architecture, whereby the functionality of the network 1 is organized into abstracted layers. This is illustrated schematically in FIG. 4. In this example, the network 1 implements the Internet protocol suite, whereby the functionality is organized into four layers 108-102: an application layer 108 (comparable to a combination of layers 5, 6 and 7 of the OSI ("Open Systems Interconnection") model), a transport layer 106 (comparable to layer 4 of the OSI model) below the application layer 108, a network layer 104 (comparable to layer 3 of the OSI model)—which is an internet layer—below the transport layer 106, and a link layer 102 (comparable to a combination of layers 1 and 2 of the OSI model) below the internet layer 104. The application layer 108 provides process-to-process communication between processes running on different hosts i.e. general purpose computer devices connected to the network 1 such as user devices 6 and servers 12, 14 (note that routers 3 and NATs 8 are not "hosts" as the term is used herein). The transport layer 106 provides end-to-end communication between different hosts, including providing end-to-end channel(s) between hosts for use by the processes. The internet layer 104 provides routing i.e. communication between different individual networks of the internet 1, e.g. via routers 3/NATs 8 which operate at the internet layer, with the latter providing translation of network address information at the internet and transport layers (network address translation). The link layer 102 provides communication between physical network addresses—for instance, MAC ("Medium Access Control") addresses—of adjacent nodes in same individual network the internet 1 e.g. via network switches and/or hubs etc. which operate at the link layer 102.

Application layer data 17 (application data, e.g. user data) to be transmitted over the network 1 is passed at a transmitting host from the application layer 108 to the transport layer 106, at which it is packetized into transport layer packet(s) in accordance with a transport layer protocol such as UDP ("User Datagram Protocol") or TCP ("Transmission Control Protocol"). TCP is a "reliable" stream delivery service in that it involves acknowledgment/retransmission mechanisms whereas UDP is an "unreliable" stream delivery service in that it does not involve any such mechanisms. Packets of unreliable services are called datagrams. The data of the transport layer packet(s) (e.g. TCP packet(s)/UDP datagram(s)) are then passed to the internet layer 104 at that host, at which the data is further packetized into IP datagram(s) in accordance with the Internet Protocol (which is an internet layer protocol). The data of the IP datagram(s) are then passed to the link layer 102 for transmission over the network 1 to a receiving host. When received at the receiving host, the data of the IP datagram(s) is passed up to the internet layer 104, at which the data of the transport layer packet(s) is extracted from the payload(s) of the IP datagram(s) and passed up to the transport layer 106, at which the application data is extracted from the payload(s) of the transport layer packet(s) and passed up to the application layer.

Figure 4:
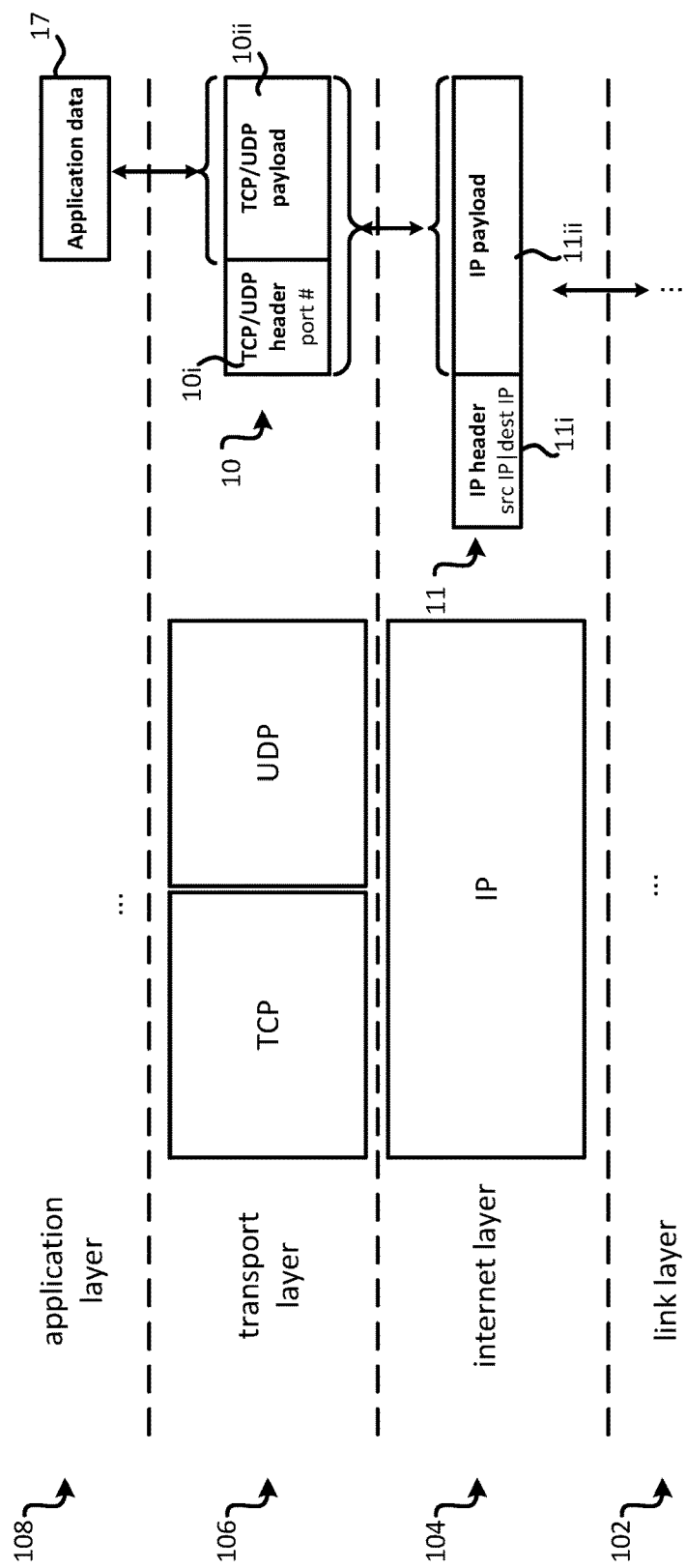
FIG. 4 shows a representation of layered network architecture.

A transport layer packet (e.g. TCP packet or UDP datagram) 10 is illustrated in FIG. 4. The Transport layer packet 106 comprises a transport layer header (e.g. UDP/TCP header) 10i—which is generated and attached at the transport layer 106 of the transmitting host—and transport layer payload (e.g. UDP/TCP payload) 10ii—which encodes application data received from the Application layer 108.

An IP datagram 11 is also illustrated. The IP datagram 11 comprises an IP header 11i, which is generated and attached at the internet layer 104 of the transmitting host, and an IP payload 11ii, which encodes the data of the transport layer packet(s) received from the transport layer 106. The IP header comprises a destination IP address, which is an IP address to which the IP packet 11 is directed through the network 1, and a source IP address, which is an IP address local to the host (at least at this stage of packet generation) which generates the IP datagram.

For packets generated within a private network (e.g. 5a/5b), the IP header 11i includes a source IP address which is a private network address in the private address space of that private network (e.g. private network address of user device 6a/6b in 5a/5b). The UDP/TCP header(s) 10i contained in one or more such IP packet payloads 11i includes a port number of a port associated with that private address. The IP address and port number constitute a transport address.

As indicated, such a private address space is not useable outside of that private network. As such, were a simple router used to forward IP datagrams between that private network (e.g. 5a/5b) and the public Internet 2, nodes outside of that private network would be unable to respond to such datagrams as they would not have any useable source address in the IP header.

To this end, a NAT 8 may be used to provide an interface between a public and private network.

Figure 5:
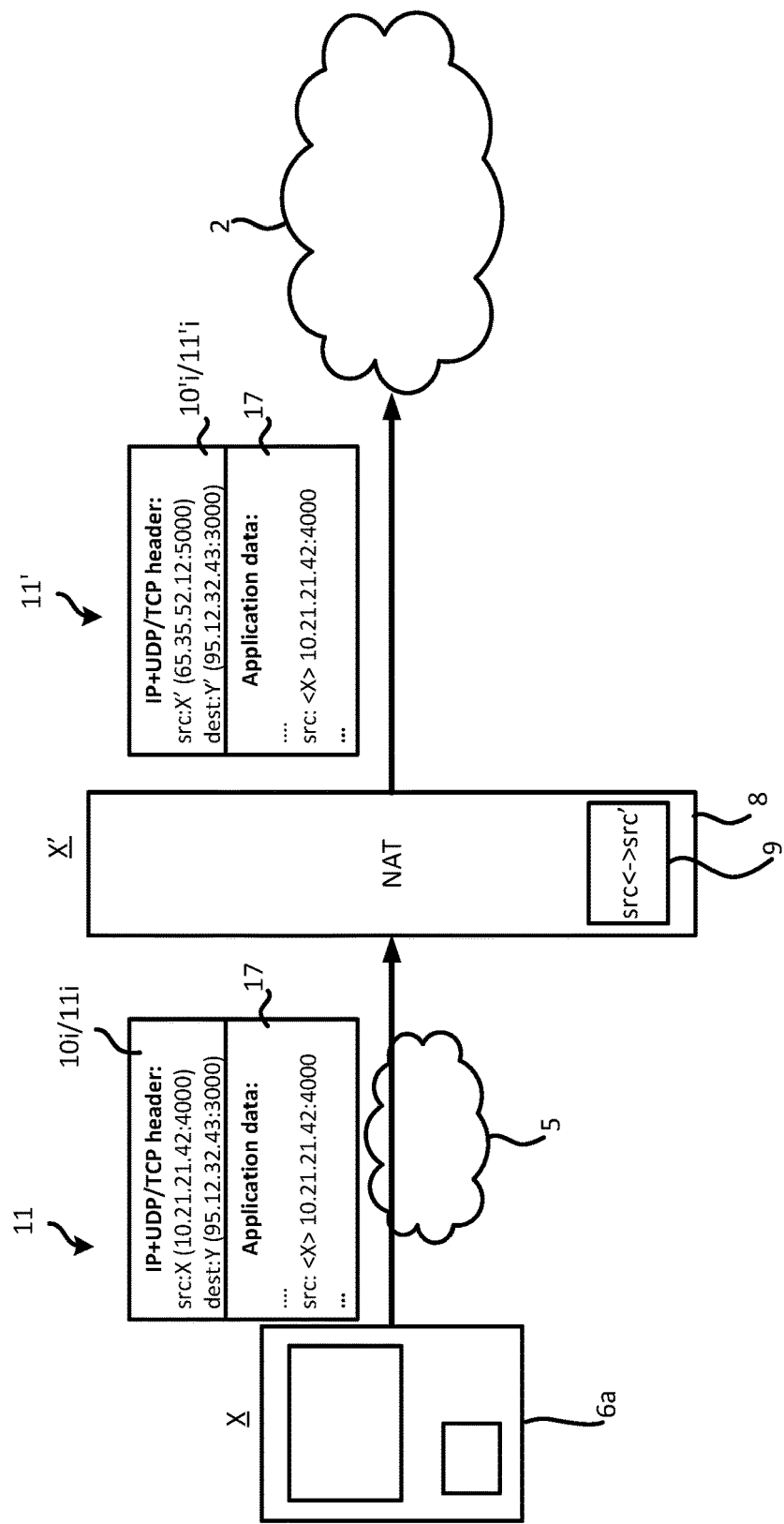
FIG. 5 illustrates operation of a Network Address Translator.

FIG. 5 illustrates the operation of a NAT 8 (e.g. 8a, 8b). IP datagrams 11 are received by the NAT via a private network 5 (e.g. 5a, 5b) from a node of that network such as a user device 6 (e.g. 6a/6'a, 6b/6'b). The IP and TCP/UDP headers 11i, 10i convey an initial source transport address of the user device 6, which comprises a private network address (which is a private IP address) of the user device 6 in the private address space of the private network 5 and a port associated with that private address. The IP and UDP/TCP headers 11i, 10i also convey a destination transport address to which the IP datagram 11 has been directed by the user device 6.

As shown, for each IP datagram, the NAT 8 modifies the IP and TCP/UDP headers 11i, 10i to replace the initial source transport address with a new source transport address, thereby generating a modified IP datagram 11' with modified IP and TCP/UDP headers 11'i, 10'i conveying the new source transport address. The destination transport address and application data 17 are unmodified by the NAT 8. The new transport address is formed by a public network address (which is a public IP address) of the NAT 8 in the public address space of the public network 2, and a port associated with that public IP address.

The NAT 8 maintains a mapping 9 between the initial transport address and the new transport address so that it can forward any return traffic that has been directed to the new transport address via the public network 2 (and which will thus end up at the NAT 8) to the initial transport address of the user device 6 via the private network 5.

In the simplest example, the NAT simply replaces the private IP address with its own public IP network address and does not alter the port. However, it is becoming increasingly common for NATs to implement address space masquerading, whereby the private address space is hidden behind a single network address. To prevent ambiguity in return packets, the NAT generally has to alter other information such as the port associated with the source address. For instance, a NAT may have a single public IP address and replace every transport address in the private address space with its own single public IP address and a unique (and likely different) port so that outside of the private network, nodes of the private network are distinguished from one another only by ports associated with that single public IP address.

This is generally acceptable for protocols (such as Hypertext Transfer Protocol (HTTP)) which simply direct responses to the source address in the IP header.

However, others protocols including some media session signalling protocols (such as Session Initiation Protocol (SIP)) also rely on the address of endpoints encoded in the application data 17 itself. For example, the SIP protocol dictates that endpoints should use addresses which are contained in an SIP invite/SIP response to establish the media session, which will be encoded at the application data level. As illustrated in FIG. 5, this is not modified by the NAT 8.

Thus, for example, suppose the first user device 6a in FIG. 1 were to transmit application data 17 constituting a media session invite to the second user device 6b via the first NAT 8a. That NAT 8a would not modify the application data 17 thus, having received the invite, the second user device 6b would attempt to respond to the invite using the unmodified private transport of the first user device 6a from the unmodified application data 17—this would fail as that private address is not useable outside of the private network 5a, and it would therefore not be possible to establish the session. Similarly, even if the first user device 6a were not behind the NAT 8a and instead had its own public IP address, the session establishment would still fail as the second user device 5b is behind the NAT 5b: in responding to the invite with a session invite response, the second user device 6b would include its own private address in the second address space of the second private network 5b in the response encoded at the application data level, which is similarly not useable by the first user device 6a.

To this end, protocols such as STUN ("Session Traversal Utilities for NAT") and TURN ("Traversal Using Relay NAT") have been developed to enable SIP sessions and the like to be established between endpoints which are separated by one or more NATs.

STUN allows an endpoint to determine whether or not it is located behind a NAT and, if so, the public address of the NAT which is mapped to the private address of the initiating endpoint (i.e. effectively giving it access to the mapping 9) so that the endpoint may include that public address in the IP payload(s) rather than its own private address. Typically, STUN works by the initiating endpoint sending a query to a STUN server, which is relayed to the STUN server through the NAT and via the public network as IP datagram(s). Because the NAT replaces the private address in the IP header(s) of the query with the corresponding public address on the public side of the NAT, the STUN server can obtain the latter from the IP header(s) of the query, which it can, in turn, provide to the initiating endpoint. The initiating endpoint can then establish the session using that public address rather than its own private address, thereby conveying a useable address at the IP payload level to the responding endpoint in the session request. The responding endpoint can similarly discover its associated public address which it can convey to the initiating endpoint at the application data level in the response rather than its own private address. The role of the STUN server is effectively one of providing address discovery, and generally it does not participate in the media session once established.

As is known in the art, there are circumstances in which such a session cannot be established even when the public address of the NAT is known, for instance when the initiating and/or responding endpoint is behind a symmetric NAT. In such circumstances, one or more TURN relay servers can often be used to traverse the NAT by relaying media data through the TURN server(s).

When an endpoint needs to use a conventional TURN relay, it sends a request to the TURN relay requesting that a unique public transport address, i.e. an individual port, on the TURN relay be allocated to the endpoint. If the request is accepted, the media session is then established using that public address of the TURN server as the source address for that endpoint. That endpoint sends to the TURN server media that it wishes to transmit in the session contained in TURN messages. The TURN server extracts the media from the TURN messages, and relays it onwards from the public address on the TURN server which has been allocated to that endpoint as a source address. The TURN server also relays data intended for that endpoint which has been directed to the address allocated on the TURN server to that endpoint contained in TURN messages for extraction by that endpoint.

If both endpoints are located behind NATs that do not permit STUN, then each will need its own respective transport address to be allocated on a TURN server, in which case the media session is established between those two allocated TURN server addresses and each endpoint relays/receives data in TURN messages, with data provided to the TURN servers being transmitted and received to/from the two TURN server addresses allocated to those endpoints in the media session.

TURN relaying requires resources—including the unique public transport address(es) allocated on the TURN server(s)—to be allocated on that (those) server(s) for at least the duration that media session, and also means that media of the media session travels via a less direct path than when a media session is established directly between the endpoints or via one or more NATs. Though it does require additional resources, TURN relaying can more or less guarantee to provide a useable path through a network for a media session.

STUN and TURN functionality can be incorporated in the same server, which is sometimes referred to as a TURN/STUN server or simply as a TURN server even though it also includes STUN functionality.

The media relay servers 14 of FIG. 1 are TURN servers, which incorporate at least TURN functionality and thus have both address lookup and media relay functionality. Alternatively, this and/or other functionality may be split between separate servers, or the functions performed by the media relay servers 14 described below may be performed by the same server.

ICE ("Interactive Connectivity Establishment") is a known protocol that is used for establishing connectivity for VoIP sessions traversing network address NATs and firewalls, which attempts to establish the most efficient path in terms of media latency to ensure ideal media quality. Details of the ICE protocol can be found in the publically available RFC 5245, Interactive Connectivity Establishment (ICE): A Protocol for Network Address Translator (NAT) Traversal for Offer/Answer Protocols, J. Rosenberg (April 2010). Certain extensions to the ICE protocol are defined in [MS-ICE2] Interactive Connectivity Establishment (ICE) Extensions documentation (http://msdn.microsoft.com/en-us/library/office/cc431504(v=office.12).aspx).

In the context of ICE, a direct path, i.e. not involving any TURN relaying, between clients is preferred for a media session over an indirect path e.g. that involves using intermediate relay servers (e.g. relaying through TURN server(s)). A path is identified by a pair of transport addresses—one of which is used to transmit and receive data by an initiating endpoint and the other to transmit and receive data by a responding endpoint.

The ICE protocol attempts to identify what it deems to be the most efficient path based on static priorities, which are assigned to each of a number of so-called "candidate pairs" that could be used for the media session. A candidate is a transport address associated either an initiating endpoint or a responding endpoint. A candidate pair is a pair of candidates (i,r), the first (i) associated with (i.e. available to) the initiating endpoint and the second (r) with the responding endpoint. The term "candidate" relates to the fact that the ICE mechanism initially assumes that any transport address associated with an endpoint might be useable for a media session (though it may not actually be useable for reasons discussed above)—the ICE protocol then involves detecting which of the identifying candidate(s) are actually useable.

ICE classes candidates into 3 categories: host candidates, reflexive candidates and relayed candidates.

A host candidate is a transport address which is local to the endpoint in question i.e. on a network interface directly attached to the endpoint. For example, the private addresses of the user devices 6a, 6b are local to those user devices and are thus host candidates, and similarly if the user devices were directly connected to the public network 2 (rather than or in addition to via the NATS 8a, 8b) they would have their own public addresses local to those user devices which would also be host addresses.

A reflexive candidate is a transport address which is not local to an endpoint, but which is a translated transport address on the public side of a NAT (e.g. as included in the modified IP header 11'i of FIG. 5). These are classed into two sub categories: "server reflexive candidates" which are public NAT addresses discovered by querying a server e.g.

STUN server in the manner outlined above, and "peer reflexive candidates" which are discovered by the other endpoint during the establishment of the media session (e.g. a public side NAT address associated with the initiating endpoint as discovered by the responding endpoint, or vice versa).

A relayed candidate is a transport address allocated from a media relay server e.g. TURN server in the manner outlined above.

Potentially, any of the initiating endpoint's candidate transport addresses can be used to communicate with any of the responding endpoint's candidate transport addresses. That is, the first user device 6a can potentially direct data from any of its own associated addresses to any of the addresses associated with the second user device and vice versa.

However, in practice, some candidate pairs will not be valid (i.e. will not work). For instance, if the endpoints are both behind NATs and their host candidates are private addresses in the private networks 5a/5b, they are unlikely to be able to communicate directly using those addresses for the reasons discussed above. However, if their host candidates are public addresses which, when used, do not involve routing data through any NATs then the candidate pair may be valid. Similarly depending on the type of NATs (e.g. if it is a symmetric NAT), use of reflexive candidates may not be possible as discussed.

Each candidate pair thus potentially represents a path through the network of a certain type, although such a path will only be available in practice if the candidate pair is actually valid.

The order in which candidate pairs are tried is dictated by the ICE static priority scheme, with higher priority pairs being tried ahead of lower priority pairs.

In accordance with the ICE protocol, each candidate can be assigned a static priority in accordance with equation 1:

$$\text{priority}=(2^{24})*(\text{type preference})+(2^{8})*(\text{local preference})a.+(2^{0})*(256-\text{component ID})$$

The type preference is an integer from 0 to 126 inclusive, and represents the preference for the type of the candidate (local, server reflexive, peer reflexive, and relayed). 126 is the highest preference, and a 0 is the lowest. Setting the value to a 0 means that candidates of this type will only be used as a last resort. The type preference is identical for all candidates of the same type and is different for candidates of different types. The type preference for peer reflexive candidates is higher than that of server reflexive candidates. The ICE protocol recommends values of 126 for host candidates (unless these are from a Virtual Private Network (VPN) interface, in which case 0 is recommended), 100 for server reflexive candidates, 110 for peer reflexive candidates, and 0 for relayed candidates. The local preference is an integer from 0 to 65535 inclusive and represents a preference for the particular IP address from which the candidate was obtained when an endpoint is multihomed (connected to more than one computer network). When there is only a single IP address, ICE recommends setting this to the maximum of 65535, effectively making this term redundant when there is no multihoming. The component identification (ID) term is an identifier of the candidate. As can be seen, by far the most significant term in equation 1 is the first term which is based on the candidate type. Thus the ICE priority scheme deprioritizes indirect paths via relayed candidates, which it uses only as a last resort, and moreover biases the static priorities away from reflexive candidates. Once the candidate pairs are formed and priorities assigned in accordance with equation 1, candidate pair static priorities for each candidate pair can be calculated in accordance with equation 2:

$$\text{pair priority}=2^{32}*\text{MIN}(G,D)+2*\text{MAX}(G,D)+ (G>D?1:0)$$

where G is the static priority for the initiating endpoint's candidate, D for the responding endpoint's candidate, and $G>D?1:0$ an expression whose value is 1 if G is greater than D, and 0 otherwise.

The lowest priority path is the TURN-TURN path, i.e. corresponding to the TURN-TURN candidate pair, in which both network addresses are TURN serer addresses such that media data is relayed via one or more TURN servers in both directions. Thus, in conventional ICE, this is checked only when all other candidate pairs have been checked and determined to be invalid, and is therefore used only as a last resort when all other options have been definitively exhausted.

To summarize, the ICE can be used to establish media flow between a callee endpoint and a caller endpoint. In typical deployments, a network address translation (NAT) device or firewall might exist between the two endpoints. NATs and firewalls are deployed to provide private address space and to secure the private networks to the endpoints. If the endpoint advertises its local interface address, the remote endpoint might not be able to reach it. Moreover, NATs and firewalls exhibit differing behaviour in the way they create the NAT-mapped addresses. ICE provides a generic mechanism to assist media in traversing NATs and firewalls without requiring the endpoints to be aware of their network topologies. ICE assists media in traversing NATs and firewalls by gathering one or more transport addresses, which the two endpoints can potentially use to communicate, and then determining which transport address is best for both endpoints to use to establish a media session.

Existing ICE Protocol:

In order to provide context, a conventional ICE signalling procedure will now be described with reference to FIG. 6.

Figure 6:
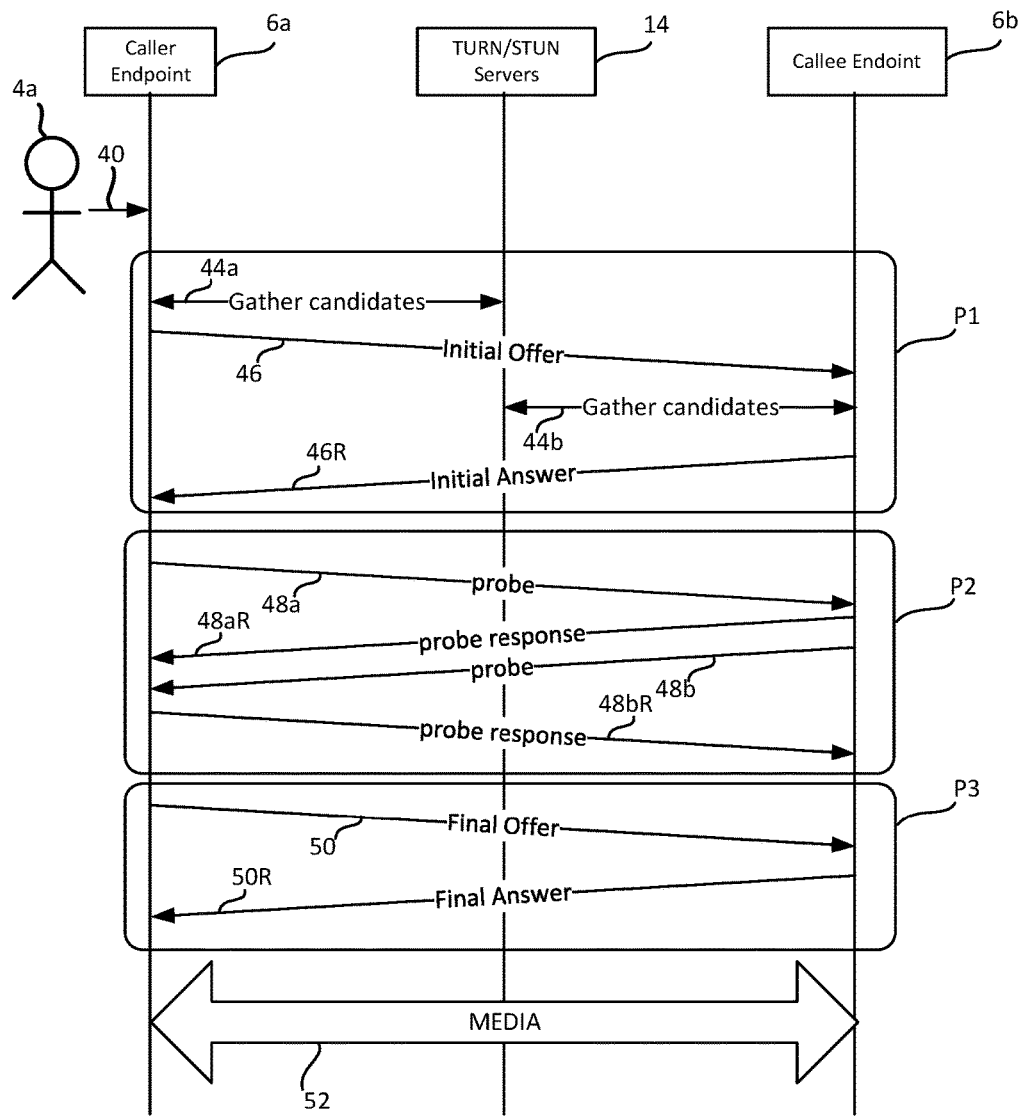
FIG. 6 shows a signalling diagram for a conventional ICE signalling flow.

FIG. 6 shows a sequence diagram that outlines the various phases involved in establishing a session between two endpoints, a caller 6a and callee 6b, using ICE. These phases are:

a. Candidate gathering and the exchange of gathered transport addresses between the caller and callee endpoints (P1);

b. Connectivity checks (P2);

c. The exchange of final candidates selected by the connectivity checks (P3).

During the candidate gathering phase P1, endpoints gather potential candidates for connectivity. This includes host candidates (bound to local interface), server reflexive candidates (NAT mapping discovered using TURN server 14, using the STUN protocol), and relayed candidates (forwarding port allocated on the TURN 14, aka in its role of media relay server). The server reflexive and relayed candidates are discovered by exchanging gathering messages 44a between the initiating endpoint 6a and one of the TURN servers 14. The candidate gathering phase P1 is instigated in response to a session instigation instruction 40 at the initiating device 6a, which is received from the user 4a in this example but could alternatively be generated automatically, e.g. at a predetermined time.

The candidates gathered by the callee 6a are sent to the caller 6b in an initial offer message 46 via the network 2. The offer can be encoded into a Session Description Protocol (SDP) offer and exchanged over a signalling protocol such as SIP. The caller endpoint 6a serves as a controlling agent and is responsible for selecting the final candidates for media flow. The callee 6b, in response to receiving the offer 46, follows the same procedure to gather its candidates, by exchanging candidate gathering messages 44b with one of the TURN servers 14 (this can be the same TURN server or a different TURN server to that used by callee 6a). The candidates it gathers are encoded and sent to the caller in an initial answer message 46R via the network 2. With the exchange of candidates complete, each endpoints 6a, 6b is now aware of its peer's (i.e. the other endpoint's) candidates.

At the initiating endpoint 6a, the session instigation instruction 40 constitutes a session instigation signal. At the responding endpoint 6b, it is the offer 46 from the initiating endpoint 6a that constitutes a session instigation signal.

To ensure each endpoint can receive the other's candidates, the candidates can for example be transmitted via one of more proxy servers 15, such as SIP server(s), though this is not shown in FIG. 6.

During the connectivity checks phase P2, both endpoints 6a, 6b pair up the local candidates and remote candidates to form a so-called "check list" of candidate pairs that are ordered based on the priorities of the candidate pairs, and systematically perform connectivity checks using STUN binding request response exchanges.

This involves the caller 6a and the callee 6b attempting to exchange probe data for each candidate pair in the following manner. For each candidate pair, each of the endpoints 6a, 6b transmits to the other endpoint a probe message 48a, 48b (which are STUN binding requests). Each probe message 48a, 48b is transmitted to the transport address in that candidate pair of the other endpoint, and indicates in its body the transport address in that candidate pair of the transmitting endpoint, i.e. within the application layer data 17 of the probe message such that it is unaffected by any modification to the IP or transport header 10i/11i by any NAT 8a, 8b that the probe message passes though in transit (if this differs from the transport address denoted in the IP and transport headers, the receiving endpoint can deduce that the probe message has indeed passed through a NAT, and can also determine the transmitting endpoint's public transport address on that NAT. This is a means by which peer reflexive candidates can be discovered during the connectivity checks P2, as is known in the art). If and when this message is successfully received by the other endpoint, it transmits a response 48aR, 48bR (STUN binding response) to the transport address indicated in the body of the probe message. If and when the response is received by the endpoint that transmitted the request 48a, 48b, that endpoint determined that candidate pair to be valid. For each candidate pair, in some cases, the endpoint may attempt to send multiple probe messages up to a retry threshold after a suitable timeout if no response is received, before finally determining the candidate pair to be invalid once the retry threshold has been reached.

The ordering of the connectivity checks ordering based on ICE priorities ensures that TURN relaying is only used as a last resort in conventional ICE, if and only if all other types of paths fail.

At the end of the connectivity checks the caller 6a selects (in phase P3) the best candidate pair to be used for media flow and all other candidates are discarded. The caller 6a communicates the selected candidate pair to the callee 6b in a final offer message 50, and the callee confirms the selection with a final response 50R.

Once this final answer-offer exchange 50, 50R has been completed, a media session 52 is established using the selected candidate pair, such that media data of the media session is transmitted between the endpoints 6a, 6b using the transport addresses of that candidate pair. Depending on what candidate pair is selected, the media data may be transmitted directly between respective host addresses of the endpoints (generally only possible if the endpoints are not behind NATs 8a, 8b, or if they happen to be behind the same NAT such that their host addresses are addressable to each other), or through a NAT 8a, 8b in one or both direction (where one or both of the candidates of the selected pair is a reflexive address, such that media data is transmitted to that address on the public side of the NAT) and/or via a TURN server or servers 14 in one or both directions (where one or both of the candidates of the selected pair is a relayed candidate) only as a last resort.

The Traversal Using Relay NAT (TURN) protocol used by ICE enables a TURN client located on a private network behind one or more network address translation (NAT) to allocate a transport address from a TURN server that is sitting on the Internet 2. This allocated transport address can be used for receiving data from a peer. The TURN protocol also enables the client to discover its external NAT mapping.

Figure 7:
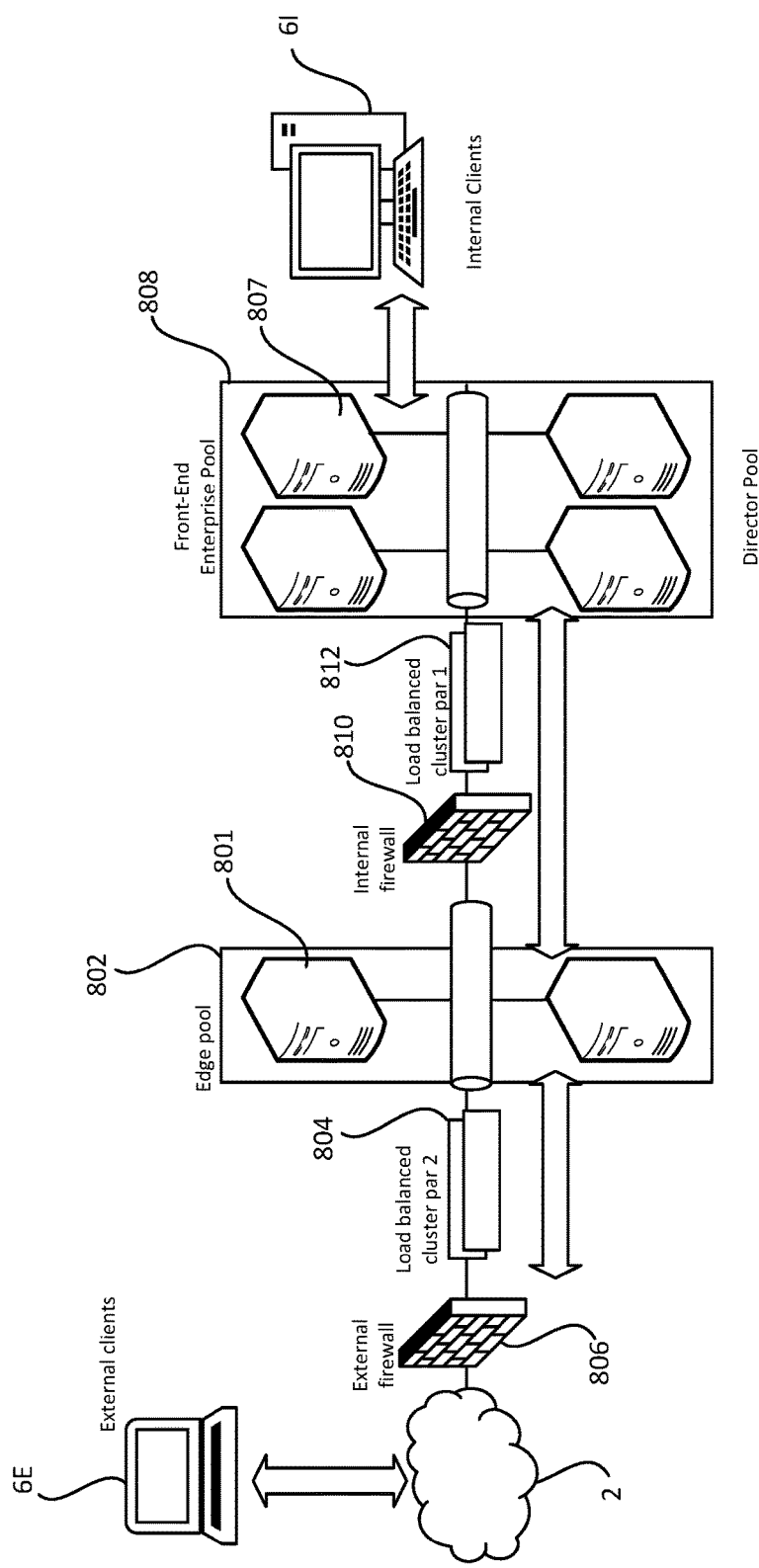
FIG. 7 shows an example server deployment, with a conferencing server deployed on a private network.

Online Service Deployment:

FIG. 7 shows a highly schematic block diagram of an example service deployment. An edge server pool 802, which can comprise multiple edge servers, connects to the public Internet 2 via an external firewall 806 and (for incoming traffic) at least one load balancer 804. These can for example be implemented as separate instances of edge server software (server rolls). In a cloud computing context, each instance may run on a virtual machine, which is executed on the underlying cloud computing hardware.

Requests from external client endpoints 6E connected to the Internet 2 are received at the load balancer 804 via the external firewall 806, an available edge server instance in edge pool 802 is selected, containing at least one and preferably multiple edge servers 801, to handle the request, according to a suitable load-balancing scheme. That is, to a public IP address of the load balancer 804.

The edge server 801 connects to a front-end (FE) enterprise pool 808 in a private network ("FE box"), which again can comprise multiple server FE servers 807, via an internal firewall 810 and (for incoming traffic) at least one further load balancer 812. A request from the edge server pool 802 can be received at the further load balancer 812, which selects an available FE server in front-end pool 808 to handle the request.

The external clients 6E can connect to the FE server 807 via the Internet 2 but only via the edge server 801. Any internal client endpoints 61 of the private network can connect to the FE server 807 directly via the private network; however, a deployment with may have no such internal clients 61, for example an "online deployment".

In an online deployment, conferencing is offered as a service, by a service provider, to subscribing companies or other organizations. The service provider hosts all MCU servers in their deployment and the subscribing companies are just consumers of the resources provided by the service provider. The service provider is responsible for hosting of all the multipoint control unit (MCU) servers and making the deployment simple and easy to consume for the subscribers. The online deployment can cater to multiple companies that subscribe to the conferencing service.

Conferencing Server—Private Deployment

By way of context, in this section, an example deployment of conferencing servers within a private network, with TURN servers operating as edge servers, will be described with reference to FIG. 7. This section will also explain certain deficiencies with this deployment model, and the next section will explain how these are overcome in embodiments of the present invention.

With reference to FIG. 7, the edge server 801 operates as a relay server, and specifically a TURN server 14—not a conferencing server CS—wherein the edge pool can comprise multiple TURN server instances.

The FE enterprise pool 808 contains at least one conferencing server instance, i.e. at least one MCU instance; that is, at least one FE server 807 operates as a conferencing server, but which is only accessible to external clients 6E via the edge relay server 801.

A media stack transport layer of the deployment implements ICE protocol (STUN and TURN) for establishing connectivity between endpoints. That is, media transport is provided according to ICE Remote Function Call (RFC). As noted, the ICE protocol is a generic mechanism that attempts to gather and probe all available paths. This is a general purpose connectivity protocol and does not attempt to optimize for known deployment constraints and in the process takes time to gather candidates and converge on the optimal media path and utilizes more bandwidth than necessary during the process.

Various drawbacks of this approach will now be described.

Delay in Gathering Relay Candidates

During the candidate gathering phase ICE attempts to gather every possible candidate. This includes TURN TCP, TURN UDP, server reflexive candidates and host candidates. The host candidates can be gathered almost instantaneously however gathering relay candidates can take time especially in poor networking conditions. Gathering of relay candidate runs in two phases. Below is a high level explanation of how this is applied in the context of FIG. 7, for an external client endpoint 6E attempting:

a. Contact Phase—multiple relay servers (if configured) in conference server edge pool 802 are probed to find a relay server instance that is reachable.

b. Allocation Phase—relay candidates are gathered from the first relay server instance that was reached in the previous phase.

The contact phase has a worst-case timeout (T1) of a few seconds. e.g.: if none of the servers are reachable the offer will be ready in T1 seconds with no relay candidates. The process proceeds to the allocation phase only if a relay server is successfully reached in the contact phase. The allocation phase has worst case timeout (T2), again of a few seconds. Including both phases the absolute worst case is ~T1+T2 seconds for the offer to be ready.

The inventors have found that, in practice, it has been necessary to increase the timeouts T1 and T2 significantly to improve reliability, since failure to allocate relay candidates will result in a connectivity failure if the endpoint is behind a NAT. This can lead to significant increase, of around 10 seconds or more, in the set-up time, meaning there is a significant delay in call-set up times.

Fragility in Relay Candidate Allocations

The inventors have observed that media relay allocation failures make up a very significant portion of the overall failures observed in such deployments. This section walks through the major issues contributing to fragility in relay allocations. Surprisingly, it has been found that, although the relay ICE candidates are supposed to provide maximum reachability and connectivity, these are in reality often the most fragile.

Media Relay Deployment Complexity

Media relay servers have two interfaces: an internal interface is accessible to the server roles in data centres of the online deployment and the external interface that is accessible from the Internet 2. This places significant demand on deployment administrators to deploy the correct ACLs (Access Control Lists) and routing rules to segregate intranet and Internet. This has been found to be a constant source of failures and maintenance in such deployments.

Moreover, whilst the relay servers in FE pool 808 can be load balanced either using hardware load balancers or Domain Name System (DNS) based load balancing, both schemes come with their own cost and added complexity. Several instances of misconfigured load balancer settings have been observed in practice. For example, unresponsive machines not taken out of load balancing rotations, incorrect load balancing policy (round robin for TCP instead of # of connections etc.), asymmetric routing resulting in failures to name a few. The complexity of the load balancing increases with the size and complexity of the deployment, to the extent that the complexity and maintenance can spiral out of control very quickly for global networks that service customers around the world.

Call Setup Time Constraints

With ICE, the candidate gathering phase is part of call setup. It is always a fine balancing act between reliability and ensuring that the candidates are gathered in a timely fashion. This can result in relay allocation failures on lossy networks especially when TCP is the only connectivity available.

Moreover, similar issues also exist, for example, with Transport Relays and their Anycast deployment model. Transport relays are a version of TURN servers that are reachable over Anycast. The Anycast model is well known in the art, and is not discussed in detail herein.

Deployment Agnostic Connectivity Scheme

It is both a strength and a weakness of ICE that is deployment agnostic: it tries to probe all available paths till the highest priority path is validated or predetermined timeout expires, resulting in delays of up to 10 seconds or more. Also this process can use in worst case utilize more than 100 kbps to establish one transport connection.

Media Latency

With the deployment model of FIG. 7, the conferencing server 807 is not directly reachable by the clients 6E and can only be reached via the media relay server 801. This adds one additional hop and processing delay for real time media traffic.

Global Vs. Local Deployments

Historically, the transport protocol stack and the deployment model described above with reference to FIG. 7 were primarily geared towards on-premise deployment models. That is, a local deployment available that, whilst available to a potentially large number of users (e.g. ~100,000), services just one organization (e.g. company). In contrast to an online deployment, servers are hosted by the owning company, and the company also manages their own deployment, servers and network. As will be apparent, this is quite different to a global on-line deployment scenario, which comes with its own particular challenges.

With the online service model and wide spread adoption of mobile endpoints this model is no longer adequate both in terms of reliability and deployment ease and maintainability for enterprise grade conferencing solution.

Conferencing Server—Private Deployment

Preferred embodiments of the present invention will now be described, in which a publically accessible conferencing server CS is provided as part of an online deployment, and geared towards the provision of conferencing as an Internet service. Again, it is noted that the terms "conferencing server", "media server" and "MCU" are used interchangeably herein.

This deployment has various benefits, including:

a. The ability to provide enterprise grade real time media experience for Service deployments with high reliability, anywhere and on any network.

b. The ability to reduce deployment complexity and cost associated with deployment and maintenance of media servers, such as AVMCU (audio/video MCU), ASMCU (application sharing MCU), and Mediation Servers.

c. Increased call setup reliability and reduced setup time, on mobile devices in particular where networking conditions and available bandwidth could be severely constrained.

d. The provision of seamless roaming of endpoints for conference calls.

e. The ability to implement multipath media flow straightforwardly.

Publicly Reachable Media Servers

In contrast to the deployment of FIG. 7, in which the media server instances run on the FE boxes and are not directly reachable to the clients, the media servers are instead deployed to be directly reachable to the clients to completely avoid the use of media relay by the media servers. The clients will also not need to gather relay candidates for cases where they have either UDP or TCP connectivity to the media servers.

Figure 8:
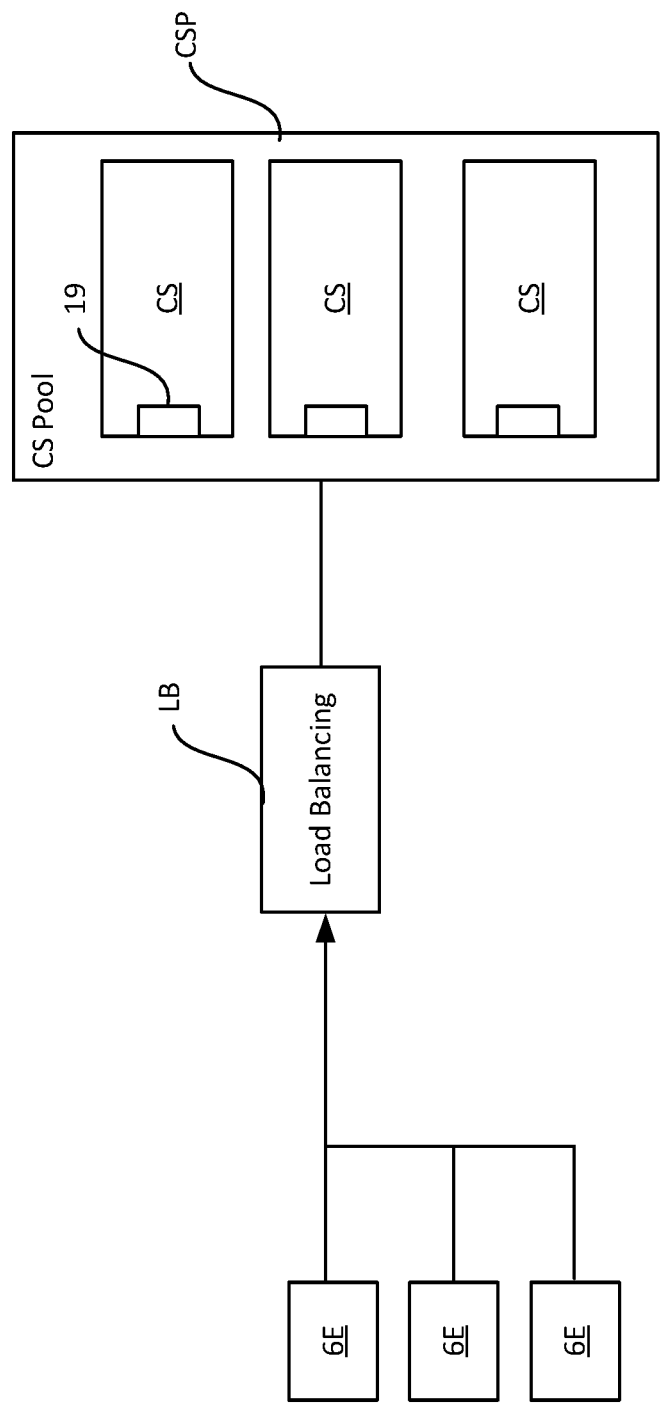
FIG. 8 shows an example architecture of a conferencing server in embodiments of the present invention.

FIG. 8 shows one example deployment of a pool CSP of conferencing servers CS, each of which is configured as described above. In particular, each of the conference servers CS in the pool CSP comprises a network interface 19 (as shown in FIG. 1) assigned a public IP address on the internet. The conferencing servers CS in the pool CSP can be implemented in a data center, or across multiple data centers.

A load balancing mechanism LB for the server pool CSP is responsible for selecting one of the conferencing servers CS to host particular conferences. This can for example comprise a local (preferably hardware) load balancer at a data center which selects one of the conferencing servers at that data center to handle a particular conference (e.g. when the first participant joins or at some other suitable time). Alternatively or in addition, it can comprise a DNS-based load balancing mechanism: in this case, the pool CSP as a whole is identified by e.g. a Uniform Resource Identifier (URI) (or URIs), and the DNS-based load balancing mechanism can select between the servers CS by resolving that URI to different ones of the public IP addresses. A combination of DNS and local load balancing, e.g. with the DNS-based load balancing being used to select a particular data center to host the conference, and the local load balancer thereat selecting one of the servers CS at that data center.

In any event, the network interface 19 of each conferencing server has at least one (unique) public IP address and is therefore directly accessible via the Internet 2, such that, once selected to host a particular conference, participant endpoints can transmit media data to it directly via the Internet 2 for processing and relaying to the other participant endpoint(s) in that conference.

Each conference server CS can for example be a virtual machine running on a data center, on which a separate instance of the conference control code 13 is executed.

For conferences hosted by the conferencing server CS, in which the external clients 6E are participating, the media relay (i.e. TURN) servers 14 are relegated to being used only in exceptional circumstances, if at all.

With this the change, a major source for call setup failure and delay is removed.

Note that, in this context, the conferencing server becomes one of the two endpoints 6a/6b in the ICE signaling flow of FIG. 6 (in contrast to the TURN server 14 which acts as an intermediary between the endpoints 6a/6b). Thus all descriptions pertaining to the signaling flow of FIG. 6 applies equally with the conferencing server CS as endpoint 6a or 6b, depending on the context.

Figure 9:
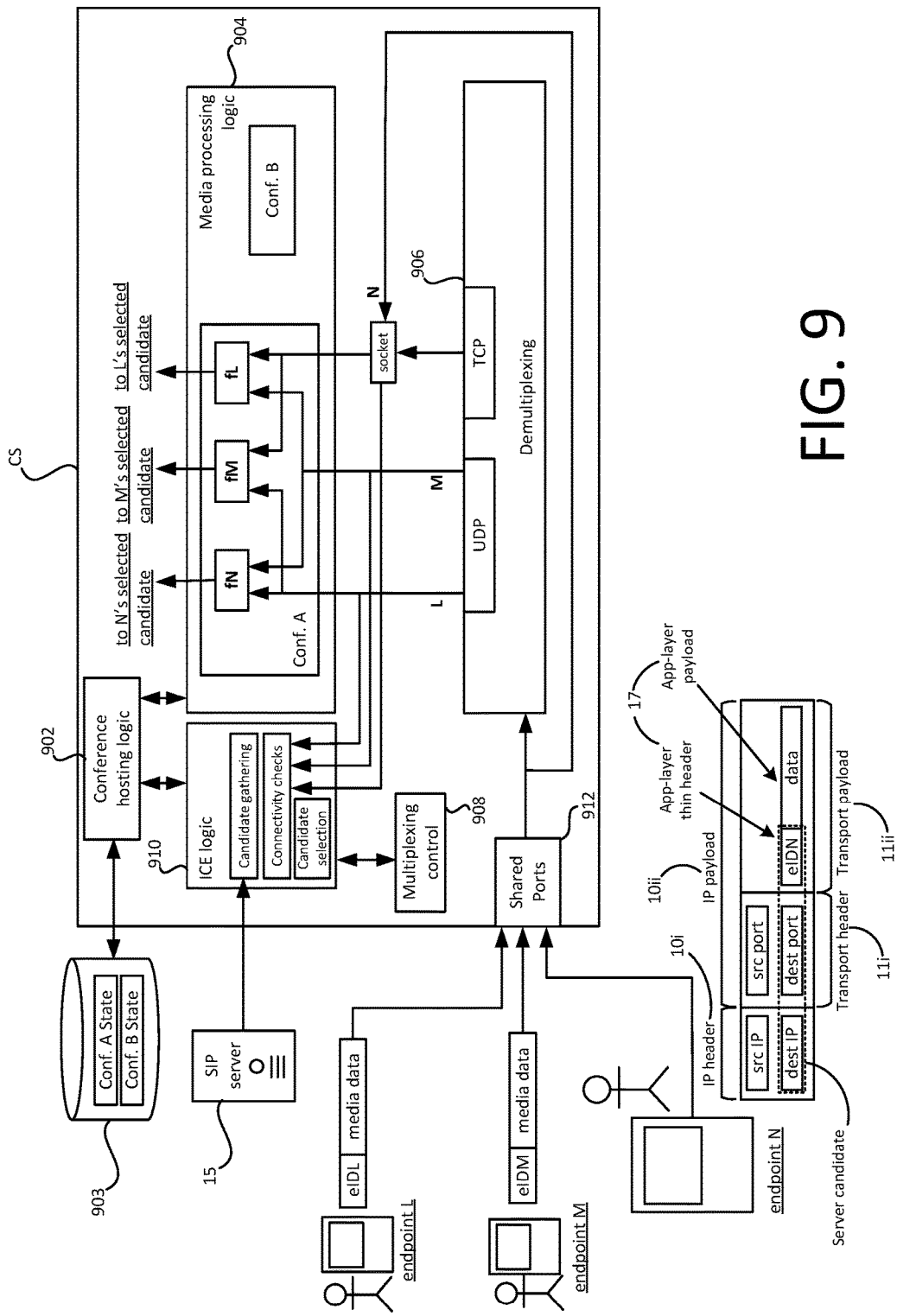
FIG. 9 shows a functional block diagram of a conferencing server in embodiments of the present invention.

FIG. 9 shows a functional block diagram of the conferencing server CS, comprising various types of logic that are described below. Each of these represents a functionality that is implemented by each of the conference servers CS in the conference server pool CSP of FIG. 9.

In particular, the conferencing server CS is shown to comprise conference hosting logic 902, media processing logic 904, demultiplexing logic 906, multiplexing control logic 908 and ICE logic 910.

The conference hosting logic 902 implements high-level conference hosting functions, it can for example comprise one or more of the following types of logic: presence logic, which tracks presence state for conference participants; translation logic, which provides automated language translation of, say, conference audio or text; recording logic, for recording conference media (e.g. creating an electronically stored audio/video recording that can be played back later); broadcasting logic, to allow conference media to be broadcast in a desired fashion, for example in a webinar. The conference hosting logic 902 may also comprise business logic; for example, to apply rules which regulate access to the conference server, and which conferencing services can be accessed by which users.

The conferencing server CS can host multiple conferences simultaneously, and is configured to maintain a call state for each of the hosted conferences in electronic storage 903 accessible to the conferencing server CS. By way of example, first and second conferences (conf. A, conf. B) are indicated, but it may be possible for a conferencing server CS to host may more conferences simultaneously.

For example, in the electronic storage 903, each conference may have a unique conference identifier that forms part of the conference state for that conference. The conference IDs are used to distinguish between different conferences hosted by the conference server CS.

The ICE logic 910 implements the ICE functionality of the conferencing server CS described herein, including the candidate gathering, connectivity checks and candidate selection. In this context, the conferencing server CS assumes the role of either the caller endpoint 6a (dial-out scenario) in FIG. 6 or the callee endpoint 6b (dial-in scenario)—see below.

The media processing logic 904 is shown to comprise a plurality of media processing components—each for a different conference participant—which processes media data received from one or more other participants in that conference for transmission to that participant. By way of example, FIG. 9 shows three participant endpoints N, M and L (which are user devices, operated by users) in a first conference (conf. A), where media processing components fN, fM and fL generate outgoing streams for transmission to endpoint N, M, and L respectively. That is, which are transmitted to the candidates selected for those endpoints following ICE connectivity checks.

For example, media processing component fN can comprise an audio mixing component, which mixes audio data received from endpoints M and L in conf. A to generate one mixed audio stream comprising both M and L's audio data for transmission to N in conf. A (likewise, fM can mix N and L's streams for M; and fL can mix N and M's audio for L).

Media processing component fN could also comprise a video selection component, which selects one or more of M and L's video streams received at the conferencing server CS in a video conference for transmission to N. Received video data may only be selectively transmitted to other participants. For example, to save bandwidth, only one of L or M's streams may be selected for transmission to N. For example, where L or M is classified as a speaking endpoint (i.e. where the corresponding user is speaking), e.g. as detected by audio processing component fN from their audio data received at the conferencing server CS, only the video of the speaking endpoint may be transmitted to N. Where N is classified as the speaking endpoint, component fN can for example switch between L and M's video streams, one at a time, so that N can gauge the reactions of all of the other users in turn. As the situation changes, fN switches between the different video streams accordingly. (Of course, this applies equally to fM with regards to N and L, and to fL with regards to N and M).

For optimal flexibility, a separate and independent media processing component can be implemented in the media processing logic 904 for each participant in each conference. That is, at least one media processing component per participant per conference to allow a bespoke conferencing experience to be offered to each participant. Whilst not essential, this will often be appropriate, particularly in the case of audio mixing where it is generally preferable for each participant in each conference to get a mixed audio stream containing the audio of all of the other participant(s) in that same conference, but not his own.

The demultiplexing logic 906 receives media data from participant endpoints connected to the conferencing server CS, and demultiplexes the received media data to render it available to the correct media processing function of the media processing logic 904. Following the example of FIG. 9:

a. media data from endpoint L in conference A is rendered available to media processing functions rM and rN for (selective) processing and transmission to endpoints M and N respectively in conference A;

b. media data from endpoint M in conference A is rendered available to media processing functions to rL and rN for (selective) processing and transmission to endpoints L and N respectively in conference A;

c. media data from endpoint N in conference A is rendered available to media processing functions rL and rM for (selective) processing and transmission to endpoints L and M respectively in conference A.

Before the media data can be rendered available to the media processing logic 904 in this manner, one or more candidate pairs for ICE connectivity checks need to be negotiated, connectivity checks performed and a candidate pair selected for each participant endpoint.

As described in more detail below, the ICE logic offers 910 each endpoint, via the proxy server 15 in the candidate gathering phase P1, at least one multiplexed host candidate, formed of a host transport address of the conferencing server CS (which is a public, host IP address on its local interface 19 plus associated port) and a unique multiplexing token. The multiplexing tokens are managed by multiplexing control logic 908, which preferably generates them on the server CS. The host transport address is shared between multiple endpoints, and the multiplexing tokens are used to demultiplex the data, i.e. to separate out the data received from different endpoints at the same host transport address.

This includes the connectivity checks phase P2, in which probe messages from different endpoints received at the shared host transport address are demultiplexed using received multiplexing tokens in the probe messages by demultiplexing logic 906, so that they can be processed by the ICE logic 910 as part of the connectivity checks.

Following successful connectivity checks, received media data of each hosted conference is demultiplexed using received endpoint IDs, which are multiplexing tokens. The endpoint ID/multiplexing token for endpoint K is denoted eIDK (K=L, M and N in the example of FIG. 9). As indicated, the multiplexing token is application-layer data 17 and, as such, forms part of the transport layer payload data 11*ii*. For example, the multiplexing token eIDK can be included in a thin application-layer header, in the first few bytes or so of transport-layer payload data 11*i*. The multiplexing token eIDK, together with the destination IP address in the IP header data 10*i* and the destination port in the transport header data 11*i*, constitute the conferencing server's candidate that is selected by the ICE logic 910 following connectivity checks.

Note TCP and UDP are handled differently at the conferencing server CS.

For UDP, each UDP datagram includes a copy of the multiplexing token eIDK in its transport layer payload data 10*ii*, which is used to demultiplex the UDP datagrams directly to isolate received probe data in connectivity checks, and during the conference itself to provide received media data to the correct media processing function(s) of the media processing logic 904.

However, for TCP, when the multiplexing token only needs to be sent in association with an incoming TCP connection request, to allow the incoming TCP request to be matched to the corresponding offer-answer exchange in candidate gathering phase P1. At this point a TCP socket is created, allowing further TCP data to be demultiplexed in the conventional manner, based on the source IP and port in the received packets (likely to be a transport address on the public side of a NAT in practice). That is, thereafter, a socket is created for each TCP endpoint so that data can be received via the TCP socket thereafter, without having to continuously include the multiplexing token eIDK thereafter. For example, the TCP socket may be created during connectivity checks when the first probe message comes in from an endpoint, the same socket may be used thereafter during the conference to provide receive media data to the correct media processing function(s) of the media processing logic 904.

In the context of TCP, the multiplexing tokens are therefore being used to demultiplex incoming TCP connection requests from each TCP endpoint, to allow that request—and a resulting TCP socket—to be matched to the earlier offer-answer exchange in the candidate gathering phase P1 for that endpoint. Thereafter, data received from that endpoint is demultiplexed in the conventional manner of TCP based on the source IP/port, and outputted via that socket to the ICE logic 210 during connectivity checks P2 or to the media processing logic 904 for processing once that endpoint has successfully joined the conference in question.

Further details of this are described below.

A benefit of using such an endpoint ID for both UDP/TCP is that the conferencing server CS may not necessarily receive the inbound TCP connect or UDP packet from the IP address/port that's advertised in the offer answer: consider the case where the client is behind a NAT (in most cases, it will be); the client will not be able to determine the IP and port mapping that the NAT will assign for the TCP connection to the server ahead of time. This is only determined during connectivity checks, as a peer reflexive candidate (see below).

The token also adds an additional layer of security in the case that the tokens are exchanged using a secure signaling channel, in the candidate gathering phase P1. In that event, the conferencing server CS can validate not only the client IP address and port negotiated by ICE but also the more secure token eIDK. Thus, an attacker would have to guess the client IP and port in addition to the token even to get through the initial validation. Accordingly, preferably the multiplexing token eIDK is communicated between the ICE logic 910 and the client during the candidate gathering phase P1, during the offer-answer exchange (46, 46R—FIG. 6), via a secure signaling channel, e.g. Secure Sockets Layer (SSL), Transport Layer Security (TLS) etc. That is, using some form of cryptographic encryption.

Candidate Gathering Changes

Media Servers

Media server roles will not gather or advertise relay candidates. They will offer only their host candidates that will be directly reachable from the clients 6E via the Internet 2.

The candidate types supported by the media servers is:

a. Host UDP Internet Protocol Version 4 (IPV4) candidate.

b. Host UDP Internet Protocol Version 6 (IPV6) candidate.

c. Host TCP IPV4 passive/active candidate.

d. Host TCP IPV6 passive/active candidate.

IPV6 candidates are needed to support the small pockets of clients that support IPV6 only.

Note: not all the supported candidate types need to be gathered for every call, the candidate gathering can be optimized based on the scenario.

Conference Dial-in

Conference dial-in is the most common use case for conference sessions. In this case, the conferencing server CS assumes the role of the callee endpoint 6b in FIG. 6. That is, for dial-in the conferencing server CS is the callee and has information about the candidate types supported by the caller client endpoint 6a, from the initial offer 46. Based on this information the media server can reduce the number of candidates gathered. For example, if the client has support for IPV4 candidates, the conferencing server CS can avoid gathering IPV6 candidates.

Similarly, if the client is not behind a UDP blocking NAT the server can avoid gathering TCP and advertising TCP candidates.

For the most common scenarios, the media server CS will thus need to gather only one local candidate (local from its perspective), namely a host UDP candidate.

This will drastically cut down the number of connectivity check paths to be probed and reduce the bandwidth needed for connectivity checks.

Moreover, common connectivity check failure buckets will be significantly reduced. The generation of this answer will be instantaneous since only the operations needed to gather host candidates are local socket binds.

Conference Dial-Out

For dial-out scenarios, the conferencing server CS assumes the role of the caller endpoint 6a in the signaling flow of FIG. 6. Since the connectivity characteristics of the callee client endpoint 6b is not known at the point the offer is generated, the offer from the media servers will include all four of the host candidate types listed above. Even though the offer consists of multiple candidates, this offer generation again will instantaneous since all the candidates are local host candidates.

Clients

As indicated, the client endpoints 6E will attempt to gather relay candidates, at most, in a few exceptional circumstances, which can vary depending on the context.

This will significantly reduce the offer/answer generation time on the servers, for all practical purposes the offer and answer generation in the absence of relay allocations will be instantaneous. The clients 6E will no longer gather or advertise server reflexive candidates.

As will be appreciated, this removes both of the candidate gathering exchanges 44a, 44b in FIG. 6, allowing the initial offer 46 to be generated instantly by the caller (which can be the conferencing server CS or client endpoint depending on the context), and the answer 46R to be generated in direct response to the initial offer 46.

The clients, if they support IPV4, will only offer IPV4 host candidates. Consider the typical case where the client has IPV4 UDP connectivity: the client will offer just one host candidate. Now the extent of connectivity checks is reduced to probing and validating a single media path.

It is important to note that having UDP connectivity or TCP connectivity does not imply that client 6E is publicly reachable on the Internet 2. The clients 6E for most cases will be behind firewalls or NATs 8. The details of setting up connectivity in that event will be covered in the section below on "smart" connectivity checks.

Smart Connectivity Checks

Connectivity checks will continue to support the RFC compliant packet formats but they will leverage knowledge of the conference join scenario and deployment to heaving optimize connectivity checks to improve reliability and reduce bandwidth utilization.

Candidate Pair Reduction

For the most common scenarios where the clients have IPV4 connectivity to the internet. (Note: not necessarily direct connectivity; they can be behind NATs 8) the ICE state machine will be reduced to just one candidate pair.

The client connectivity characteristics can be trivially discovered by probing a STUN or TURN server 14 when a network interface change occurs. Moreover this information can be cached for the most common home to work transitions.

This candidate pair will, from the perspective of the conferencing server CS, be:

a. local candidate: MCU host candidate, b. remote candidate: Client host candidate remote candidate Each of which is either a UDP or TCP, IPV4 or IPV6 candidate, depending on the client connectivity characteristics.

For example: If the client IPV4 UDP connectivity, the only candidate pair created will be:

a. MCU UDP IPV4 host candidate<→Client UDP IPV4 host candidate.

Even for the cases where the client 6E characteristics cannot be detected for any reason at most three paths will have to be probed. This is a significant reduction from the average number of candidate pairs that get created when following the ICE protocol in full.

Dynamic Discover of NAT Mappings

In the candidate gathering phase server reflexive candidates are omitted since discovering server reflexive candidates requires reaching a relay server 14. Instead of the overhead, the present deployment relies on connectivity checks to dynamically discover the client NAT mappings as a peer derived candidate dynamically on the fly. That is, as peer reflexive candidates (see above).

With this we still maintain our NAT traversal capability. The key to it is that media servers are publicly reachable. Peer derived candidate discovery are a standard part of ICE connectivity checks.

Figure 11:
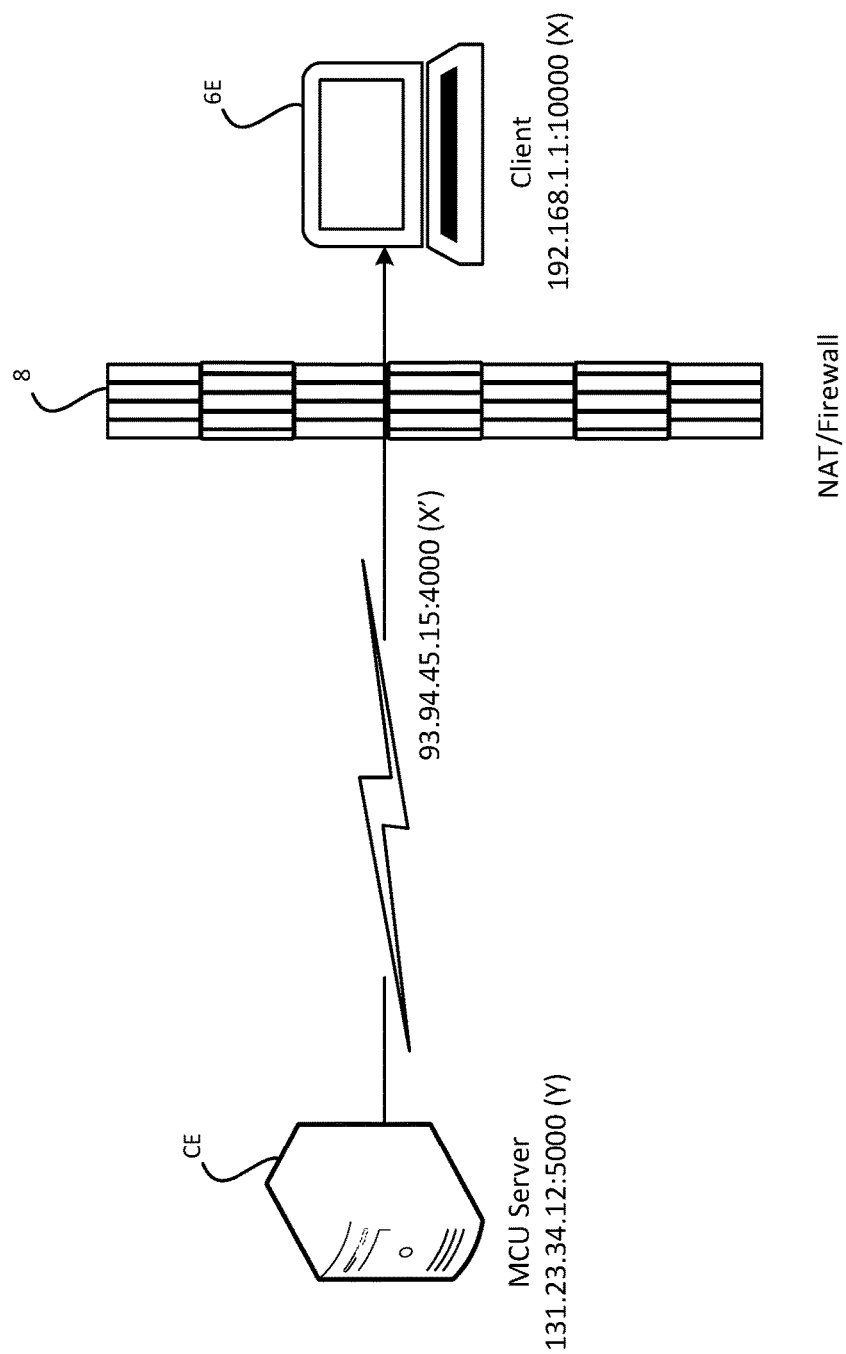
FIG. 11 illustrates an example of a peer reflexive candidate discovery performed by an endpoint and a conferencing server.

For example, FIG. 11 shows an example with a client endpoint 6E behind a NAT 8 and having UDP connectivity. The only candidate pair setup will be:

a. MCU host (Y)<→Client host (X)

on both the MCU and the client. Here, X denotes a private transport address in the private address space behind the NAT 8 (not directly reachable from the public Internet 2) and Y is a public transport address of the conferencing server CS in the public address space of the Internet.

During connectivity checks the MCU will attempt to send connectivity check packets from Y→X but this path will not work since X is not publicly reachable.

However, when the clients probe from X→Y the MCU will receive this request but it will see the packet originating from the NAT mapped address X'. The MCU will discover the X' as new peer derived remote candidate, and convey it to the client endpoint in a connectivity response during the connectivity checks. In the connectivity response received from the MCU, the client 6E will discover its own NAT mapping (X') as peer derived local candidate.

At this point both the MCU and the client have discovered the NAT mapping of the client. They will attempt connectivity checks for the path:

a. Y<→X' and X'<→Y and will be able to validate the path and setup media flow. As such, a call has now been established traversing the NAT 8 will any assistance from a media relay server 14.

Seamless Roaming

Consider the same example illustrated in the previous section where the client 6E is behind a NAT 8 and has UDP internet connectivity.

Suppose a user is at home joined to a conference on a mobile device, and during the call starts driving to work. The call is originally joined on the home Wi-Fi network. As the user moves out of range of the Wi-Fi network, the client 6E receives an interface change notification that Wi-Fi has dropped and a cellular (e.g. 3G) connection becomes available. Since the MCU is publicly reachable, the client 6E will bind to the 3G interface and send a path change request to the MCU.

The path change request is a STUN binding request message with a path-switch attribute added to it. The client 6E will continue to send this request until it gets a STUN binding response from the MCU. The MCU on receiving the path switch request will switch and start sending media to the origin address of the path change request message and also send a STUN Binding response to the client.

Security

There are no security holes with the path switch above since the path switch message is a STUN binding request that is MI (message integrity) protected.

Multipath Media Flow

Sending media on multiple paths to the MCU could be useful in several scenarios:

Endpoints that can have multiple interfaces active can use both the interfaces to improve media quality. This could be media sent over, say, Wi-Fi and 3G at the same to the MCU or media sent over two Wi-Fi interfaces.

Under lossy conditions, having multiple TCP connections to the MCU to send media may be able to provide better quality and reliability.

Multiple Interfaces

Since the MCUs are publicly reachable, the client 6E when it has a new additional interface available it can notify the MCU that it is using multi-path by sending a STUN binding request with a special multi-path attribute in the request. If the MCU supports multi-path it will respond with a STUN binding response. At this point the client 6E can start using the additional media path. This can either be augmenting media flow to improve quality or completely duplicate streams.

Multiple TCP Connections

This scenario will be used only for cases where the client has only TCP connectivity to the MCU. The MCU will keep its TCP passive candidate active for the duration of the media session. The clients can establish multiple TCP connections to the MCU passive port. Similar to the multiple interfaces support clients can advertise and negotiate multiple path support using the STUN binding request response mechanism outlined in the multiple interfaces section.

Security Ramifications of Publicly Reachable Media Servers

Attack on Publicly Reachable Ports

The servers will be open to attack and should be able to handle malicious packets. The threat of malicious packets is something that already exists in the deployment of FIG. 7 (in that deployment, hiding the media servers behind the relay server does provide a layer of protection but it is not complete: sophisticated attackers can still send malicious packets to the media servers via MCUs if they are able to spoof the client IP address); however, but being directly reachable make such attacks easier.

The token validation provides a lightweight way to detect and discard malicious packets. In addition, the media RTP packets will be protected by Secure Real-time Transport Protocol (SRTP).

Packet rate limits can also be enforced on sockets at the conferencing server CS, to alert and thwart attacks dynamically.

Firewall Requirements on Customer Sites

The deployment model would request users to open up their firewalls to our media servers. This could be a deployment inconvenience.

To mitigate this, a set of subnets on which the MCU servers will be hosted can be unified and published. Reachability to the media severs can be a made part of deployment validation and onboarding process to new customer sites.

Reduced Port Reliable Conferencing

This deployment model would request network administrators to open up their firewalls to the media server CS.

Existing conferencing servers tend to assign a unique port to each endpoint connecting to it—which would require a large range of ports to be opened up on the firewall. As will be appreciated, this has various security issues and could be a significant deployment inconvenience.

However, this is mitigated by significantly reducing the number of ports that need to be opened up, using multiplexed host candidates on the conferencing server CS.

High Level Design

First and second ports (preferably, 3478 for UDP and 443 TCP respectively) on the conferencing server CS can be deployed to be publicly accessible to client endpoints 6E. This design proposal requires only ports 3478 and 443 to be directly reachable. An additional port(s) can be opened up for video modality if needed.

For example, one port per transport protocol per modality may be provided on the conferencing server CS. For example, one TCP video port, one TCP audio port, one UDP video port and one UDP audio port.

These two ports are collectively labeled 912 in FIG. 9. All endpoints implementing port multiplexing transmit media data to port 443 for TCP (e.g. endpoint N in FIG. 9), and port 3478 for UDP (e.g. endpoints M and L). Each is referred to as a shared port, as it is shared between multiple endpoints.

Multiplexed Server Host Candidates

The media server CS offers a new type of multiplexed candidates:

a. a=x-confcandidate:1 1 UDP 2130706431 169.10.179.123 3478 typ host EndpointID:4567 b. a=x-confcandidate:2 1 TCP-PASS 174455807 132.245.112.38 443 typ host EndpointID:4567

That is, a multiplexed host candidate is a combination of host transport address (public IP+associated port) of the conferencing server CS and, in addition to the IP address and port, a uniquely assigned endpoint ID (multiplexing token).

If the client endpoint 6E advertises support for new feature extension only the new type of candidates will be offered by the media server CS. Support is negotiated via SDP.

Users will only need to setup the configuration correctly for port 3478 and 443 for optimal connectivity.

For dial-out calls the regular (non-multiplexed) candidates will be offered in addition to x-confcandidate, to provide backwards compatibility. For example, a unique host transport address (noting that this would require additional ports to be opened up on the users' firewall if backwards compatibility is to be supported).

The endpointID is preferably generated by the media server. It could alternatively be generated by the endpoint, e.g. as a globally unique identifier (GUID). However, this may require the use of a longer ID, meaning additional overhead.

Clients that do not support the advanced features will be safe to ignore these lines.

Note that, in the vast majority of cases, neither the client or servers' roles will need to gather relay candidates, as only host candidates are used.

The subsequent section describes a threading and process of demultiplexing media packets where the MCU offers the same host IP address+port for all offer/answers.

Threading Architecture

Figure 10:
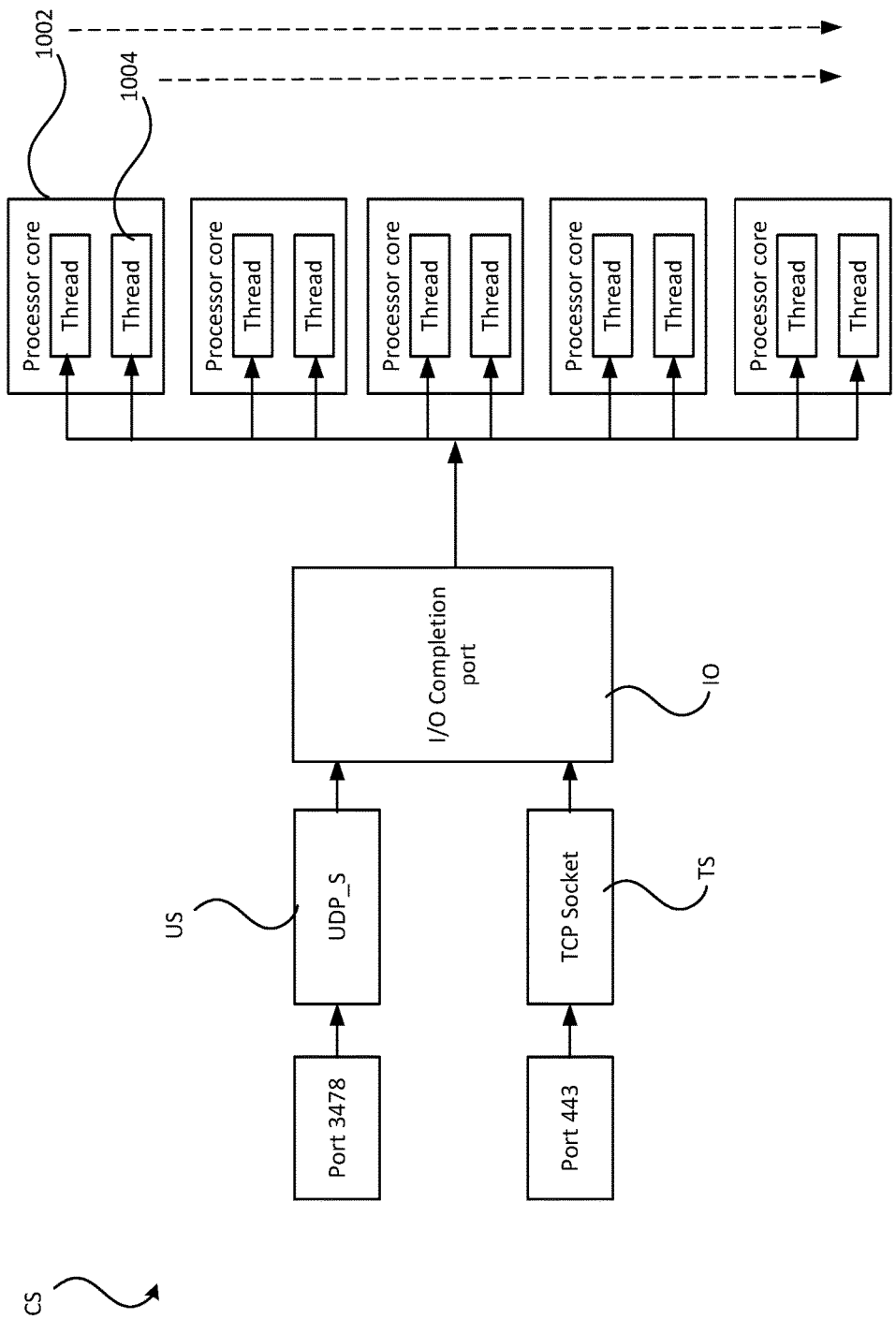
FIG. 10 shows a high-level overview of a threading model for a conferencing server.

With reference to FIG. 10, a threading model for the servicing all media traffic on 3478 for UDP and 443 for TCP at the conferencing server CS in a Windows server architecture will now be described.

The MCU has one UDP socket (US) bound to 3478 and one TCP Listen socket (TS) bound to 443. Both sockets will be associated to the same I/O (input/output) completion port (IO). This I/O completion port will be served by a number of threads 1004, where that number is twice the number of physical cores 1002 of the conferencing server CS. That is, twice the number of physical processor cores (e.g. Central Processing Unit (CPU) cores) on the physical computer device on which the incoming traffic is processed. I/O completion ports provide improved server scale and performance.

Two threads will be affinitized (allocated) to each physical core to evenly spread the load across the available cores. The sole purpose of the worker threads is to receive, post and dispatch buffers for UDP and accept inbound TCP connections for TCP.

UDP Media Receive

For UDP media traffic (e.g. audio/video), the clients 6E will need to add a thin header that has the endpointid to enable the server to demultiplex packets received on 3478. A four byte frame may be sufficient, given the expected number of endpoints expected to run on a single MCU.

When a UDP packet is received on the server, the worker threads will dispatch the buffers to one of a set of lock free queues based on the endpointid provided in the framing. There is one queue per endpoint ID. Consider a conference with N participants. There will be N endpoints on the server representing each participant. Media packets/buffers meant for each user will be encapsulated with the respective endpoint ID (token). Based on the endpoint IDs the media buffers can be dispatched the correct endpoint queue, and thus the correct endpoint.

TCP Accept

TCP connections received on 443 will be serviced by AcceptEx, as this provides the ability to not only accept inbound connections efficiently but also to read the first few bytes to identify the endpointid. That is, as well as reading the TCP header data (10$i$, FIG. 4) to accept the connection, it also reads the first few bytes of the TCP payload data 10$ii$, which in this case contains the endpointID.

The AcceptEx function is a Microsoft-specific extension to the Windows Sockets specification, details of which can be found here: https://msdn.microsoft.com/en-us/library/windows/desktop/ms737524(v=vs. 85).aspx. In short, the AcceptEx function not only accepts an incoming TCP connection request, but also reads an initial block of transport-layer payload data received from the client, which in this case comprises the multiplexing token eID.

After this point TCP does not require any additional framing since a new TCP socket will be created for every accepted connection. The newly created socket will be dispatched to the corresponding endpoint.

Media Send

For buffers sending from the server CS to the client 6E, non-blocking synchronous sends from an engine thread of the conferencing server CS can be used, or alternatively IOCP (I/O Completion Port) based sends. This threading model can co-exist with the existing architecture for supporting legacy and third party endpoints.

Note: IPV6 support can be implemented in the same was as described above.

Mid-Call Drops and Roaming

With this design, mid-call failures will only occur in cases of extreme failure cases, where the client runs into a complete networking failure. Calls can be recovered efficiently without support from signaling or additional complexity with ICE renegotiations etc. Since the servers CS are always reachable the clients can send a control message requesting the server to start sending media to a different IP/port for UDP or use a new TCP connection for TCP.

UDP

If a client's existing network drops or a new interface comes up, for recovery all the client has to do is to bind to the new interface and start sending buffers wrapped with the endpointid. The buffers will be delivered and the call will continue with minimal interruptions. The server is completely agnostic to the fact that the interface used by the peer client endpoint has changed on the receive direction. The client can send a control message to the server to start sending media to the new IP/port.

TCP

In the case of the TCP, if the existing TCP connection drops, all the client needs to recover is to reconnect with the MCU on a new TCP connection and send a control requesting the server to switch to the new TCP connection. Media will continue flowing with minimal interruption. This mechanism will just work for audio, video and video based screen sharing (VBSS). (Note: Supporting this scenario for RDP based sharing will have additional complexity since it requires a lossless transport and cannot afford to lose even a single buffer)

Multipath

Continuing from the previous section, multipath fits naturally with the multiplexed server candidate concept. For multipath the primary objective is to overcome lossy first hop network conditions. The client can bind to different types of interfaces and send media traffic. As long as the same endpointID is used the media buffers will be delivered to the right lock free queue. For TCP scenarios that client can have multiple TCP connections to the MCU. This could either be from different interface types or from the same interface type to improve throughput and reliability.

Monitoring and Alerting

The media servers will reserve a special 'endpointID' for telemetry and diagnostics. That is, a special multiplexing token which need not actually be unique to a particular endpoint.

Requests send to port 3478 over UDP or 443 over TCP with this special endpointID will be delivered to a module of the conferencing server CS that will respond to connectivity probes. For security this module will only support simple request response exchanges. This enables components independent of the deployment and certificate management/credential dependencies to assess connectivity and network conditions to the server.

With this support we can readily deploy probes to Azure, Min-Top boxes in customer deployments, synthetic transactions part of the deployment or standalone tools provide to customers for trouble shooting and deployment validation. This will enable us to monitor our deployments real time and raise alerts if the media relay servers become unavailable.

In summary, the process described above has various advantages, namely:

a. Offer and answer generation is instantaneous since no relay candidates need to be gathered.

b. Connectivity checks are fast and reliable and will typically require ~15 kbs or less since the number of paths to be probed is very small. Can be reduced to at most two paths for most scenarios.

c. Number of TCP connections and media legs involved is reduced to one. This will improve support for TCP only customer environments like Microsoft's 3M.

d. Addresses or mitigates all of the known major problems with media reliability and also has the potential to improve media quality with the reduced number servers involved in media path.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors. For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although embodiments of the present invention have been described in the context of the ICE/TURN/STUN protocols, the invention is not limited to this and can be implemented in other contexts.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A conferencing server configured to be directly accessible from the public Internet, the conferencing server comprising:

a network interface having a host transport address, the host transport address being a combination of a public IP address on the public Internet and an associated port;

conference hosting logic for hosting, at the conferencing server, at least one conference, in which media data is transmitted and received via the conferencing server between participant endpoints;

media processing logic configured to process received media data of the conference for transmission in the conference;

multiplexing control logic configured to manage a plurality of multiplexing tokens generated by the conferencing server to be used by the participant endpoints to identify the participant endpoints; and demultiplexing logic configured to identify received multiplexing tokens in transport layer payload data of a sequence of data packets received from the participant endpoints at the host transport address, and use the multiplexing tokens identified in the transport layer payload data to demultiplex the data packets for processing by the media processing logic.

2. The conferencing server according to claim 1 comprising:

candidate gathering logic configured to determine a set of one or more candidate pairs for each of the participant endpoints, by exchanging network addresses between the conferencing server and that endpoint, wherein at least one candidate pair in the set is a multiplexed candidate pair comprising the host transport address and one of the multiplexing tokens uniquely selected for use by that endpoint;

connectivity check logic configured to perform, for each of the participant endpoints, connectivity checks for at least one candidate pair in the set to determine whether it is valid; and candidate selection logic configured to select, for each participant endpoint in the conference, a candidate pair determined to be valid in the connectivity checks for that endpoint.

3. The conferencing server according to claim 2, wherein connectivity checks are performed for only the multiplexed candidate pair.

4. The conferencing server according to claim 1, wherein the media processing logic comprises audio mixing logic configured to generate a mixed audio stream for each participant endpoint in the hosted conference.

5. The conferencing server according to claim 1, wherein the media processing logic comprises video switching logic configured to switch between different received video streams for each participant endpoint in the hosted conference.

6. The conferencing server according to claim 1, wherein the multiplexing tokens are negotiated between the conferencing server and the participant endpoint via secure signaling channels.

7. The conferencing server according to claim 1, wherein the multiplexing control logic is configured to generate the multiplexing tokens for the endpoints.

8. The conferencing server according to claim 1, wherein the demultiplexing logic is configured to provide media data received from each of the participating endpoints to one or more media processing components of the media processing logic associated with that endpoint.

9. The conferencing server according to claim 8, wherein the demultiplexing logic is configured to demultiplex UDP datagrams received from each of the plurality of participant endpoints at the host transport address by:

identifying a received multiplexing token in the transport layer payload data of each of the UDP datagrams received from that endpoint, thereby identifying that endpoint as a source of that datagram, and providing media data of that UDP packet to the one or more media processing components associated with the identified endpoint.

10. The conferencing server according to claim 9, wherein the media processing logic is configured to demultiplex the UDP datagrams without using a source transport address indicated with the UDP datagrams.

11. The conferencing server according to claim 8, wherein the demultiplexing logic is configured to demultiplex TCP packets received from each of the plurality of participant endpoints at the host transport address by:

identifying a multiplexing token received at the host transport address from that endpoint, as transport layer payload data, in association with an incoming TCP connection request from that endpoint, thereby identifying that endpoint as a source of that TCP connection request, accepting the incoming TCP connection request, thereby establishing a TCP connection, and associating the TCP connection with the one or more media processing functions associated with the identified endpoint, thereby providing a path for media data from the endpoint to the media processing components via the TCP connection.

12. The conferencing server according to claim 11, wherein the demultiplexing logic is configured to accept a new incoming connection request from that endpoint when received in association with a matching multiplexing token, thereby establishing a new TCP connection, and associate the new TCP connection with the one or more media processing components, thereby providing a new path from the endpoint to the media processing components via the new TCP connection.

13. The conferencing server according to claim 12, wherein the TCP connection persists when the new TCP connection is established, thereby simultaneously providing two paths from the endpoint to the one or more media processing components.

14. The conferencing server according to claim 12, wherein the TCP connection is accepted and the multiplexing token is identified using the AcceptEx function, the multiplexing token being received in association with the TCP request in that it is received in an initial block of data read by the AcceptEx function.

15. The conferencing server according to claim 1, wherein the network interface has a first transport address used to receive TCP packets and a second transport address used to receive UDP datagrams.

16. The conferencing server according to claim 1, wherein a single TCP socket is bound to a port of the first transport address at the conferencing server, and a single UDP socket is bound to a port of the second transport address at the conferencing server, and a single I/O completion port of the conferencing server is bound to both the TCP and UDP sockets.

17. The conferencing server according to claim 16, wherein the demultiplexing logic comprises a plurality of processor cores, each of which is configured to serve the I/O completion port.

18. The conferencing server according to claim 17, wherein each of the processor cores is configured to execute at least two threads, each of which is configured to serve the I/O completion port.

19. A method of hosting, at a conferencing server having a host transport address, at least one conference, in which media data is transmitted and received via the conferencing server between participant endpoints, the host transport address being a combination of a public IP address on the public Internet and an associated port, such that the conferencing server is directly accessible from the public Internet, the method comprising, at the conferencing server:

managing a plurality of multiplexing tokens generated by the conferencing server to be used by the participant endpoints to identify the participant endpoints;

identifying received multiplexing tokens in transport layer payload data of a sequence of data packets received from the participant endpoints at the host transport address;

using the multiplexing tokens identified in the transport layer payload data to demultiplex the data packets for processing by the media processing logic; and processing media data of the conference, received in the demultiplexed packets, for transmission in the conference.

20. A computer program product comprising code stored on a computer-readable storage medium and configured, when executed on a conferencing server having a host transport address, to implement a method of hosting at the conferencing server at least one conference, in which media data is transmitted and received via the conferencing server between participant endpoints, the host transport address being a combination of a public IP address on the public Internet and an associated port, such that the conferencing server is directly accessible from the public Internet, the method comprising, at the conferencing server:

- managing a plurality of multiplexing tokens generated by the conferencing server to be used by the participant endpoints to identify the participant endpoints;
- identifying received multiplexing tokens in transport layer payload data of a sequence of data packets received from the participant endpoints at the host transport address;
- using the multiplexing tokens identified in the transport layer payload data to demultiplex the data packets for processing by the media processing logic; and
- processing media data of the conference, received in the demultiplexed packets, for transmission in the conference.

* * * * *